US012762635B1

(12) United States Patent
Schwendimann et al.

(10) Patent No.: US 12,762,635 B1
(45) Date of Patent: Oct. 13, 2026

(54) ENHANCED RIDE HAILING SERVICES AND SYSTEMS

(71) Applicant: WAYMO LLC, Mountain View, CA (US)

(72) Inventors: Lauren Schwendimann, Burlingame, CA (US); Kevin Malta, San Francisco, CA (US); Ryan Hendrickson, San Francisco, CA (US); Reed Morse, Millbrae, CA (US); Clement Wright, San Francisco, CA (US); Jonathan Willing, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/392,267

(22) Filed: Dec. 21, 2023

Related U.S. Application Data

(60) Provisional application No. 63/476,761, filed on Dec. 22, 2022.

(51) Int. Cl.
*G06Q 50/47* (2024.01)
*G06Q 10/02* (2012.01)
*G06Q 10/1093* (2023.01)

(52) U.S. Cl.
CPC ............. *G06Q 50/47* (2024.01); *G06Q 10/02* (2013.01); *G06Q 10/1093* (2013.01)

(58) Field of Classification Search
CPC ............................... G06Q 10/02; G06Q 50/47
See application file for complete search history.

(56) References Cited

U.S. PATENT DOCUMENTS 9,360,333 B2 6/2016 Tuukkanen et al.
9,557,183 B1 1/2017 Ross et al.
(Continued)

FOREIGN PATENT DOCUMENTS

CN 109657820 B * 10/2020 ............. G06Q 10/02

OTHER PUBLICATIONS

Gilibert, M. , et al., "Main Design Factors for Shared Ride-Hailing Services From a User Perspective", International Journal of Transport Development and Integration, vol. 3 (2019), Issue 3, pp. 195-206.

(Continued)

*Primary Examiner* — George Chen
*Assistant Examiner* — Duane N. Moore
(74) *Attorney, Agent, or Firm* — Botos Churchill IP Law

(57) ABSTRACT

The technology provides ride hailing systems and methods. This can include receiving, by a ride hailing system, a ride hail request from a user's client device. The ride hail request includes information about a pickup or a drop-off to be scheduled. The process includes obtaining real-time information including fleet constraint information associated with a fleet of vehicles, and applying the received information and the real-time information to a ride hailing model that was trained on training data including customer preference data and historical fleet trip information. The process includes obtaining from the model a set of ride hail suggestions including pickup positions, drop-off positions, walking paths from a given pickup position to a vehicle, and/or walking paths from a given drop-off position to a destination. The process also includes sending the set of ride hail suggestions to the client device for presentation to the user.

21 Claims, 19 Drawing Sheets

(56) References Cited

U.S. PATENT DOCUMENTS

| | | | | |
|---|---|---|---|---|
| 9,911,084 | B2 | 3/2018 | Bryson et al. | |
| 9,911,170 | B2 | 3/2018 | Kim et al. | |
| 10,572,964 | B2 | 2/2020 | Kim et al. | |
| 10,721,327 | B2 | 7/2020 | Cheng et al. | |
| 11,168,995 | B2 | 11/2021 | Ludwick et al. | |
| 11,313,688 | B2 | 4/2022 | Wang et al. | |
| 2005/0114014 | A1 | 5/2005 | Issac | |
| 2015/0339928 | A1 | 11/2015 | Ramanujam | |
| 2016/0253462 | A1* | 9/2016 | Zhong | G06Q 10/06 705/2 |
| 2016/0321566 | A1* | 11/2016 | Liu | G01C 21/3423 |
| 2016/0364823 | A1 | 12/2016 | Cao | |
| 2017/0059347 | A1 | 3/2017 | Flier et al. | |
| 2017/0213308 | A1 | 7/2017 | Wellborn et al. | |
| 2018/0060778 | A1 | 3/2018 | Guo et al. | |
| 2018/0204144 | A1* | 7/2018 | Su | G07C 11/00 |
| 2018/0342035 | A1 | 11/2018 | Sweeney et al. | |
| 2019/0340543 | A1* | 11/2019 | Gerenstein | G06Q 10/04 |
| 2020/0050198 | A1 | 2/2020 | Donnelly | |
| 2021/0293573 | A1 | 9/2021 | Sofman et al. | |
| 2022/0076170 | A1* | 3/2022 | Chang | G06Q 10/02 |
| 2022/0349219 | A1* | 11/2022 | Akutsu | G07B 15/00 |

OTHER PUBLICATIONS

Huber, Julian , et al., "Probabilistic forecasts of time and energy flexibility in battery electric vehicle charging", Applied Energy, vol. 262, Mar. 15, 2020, DOI: 10.1016/j.apenergy.2020.114525, 18 pages.

Porvatov, Vadim , et al., "Hybrid Graph Embedding Techniques in Estimated Time of Arrival Task", arXiv:2110.04228v1 [cs.LG] Oct. 8, 2021, 12 pages.

Sun, Yiwen , et al., "CoDriver ETA: Combine Driver Information in Estimated Time of Arrival by Driving Style Learning Auxiliary Task", IEEE Transactions on Intelligent Transportation Systems, DOI: 10.1109/TITS.2020.3040386, Dec. 2020, 13 pages.

* cited by examiner

100

120

160

400

600

700

800

900

1000

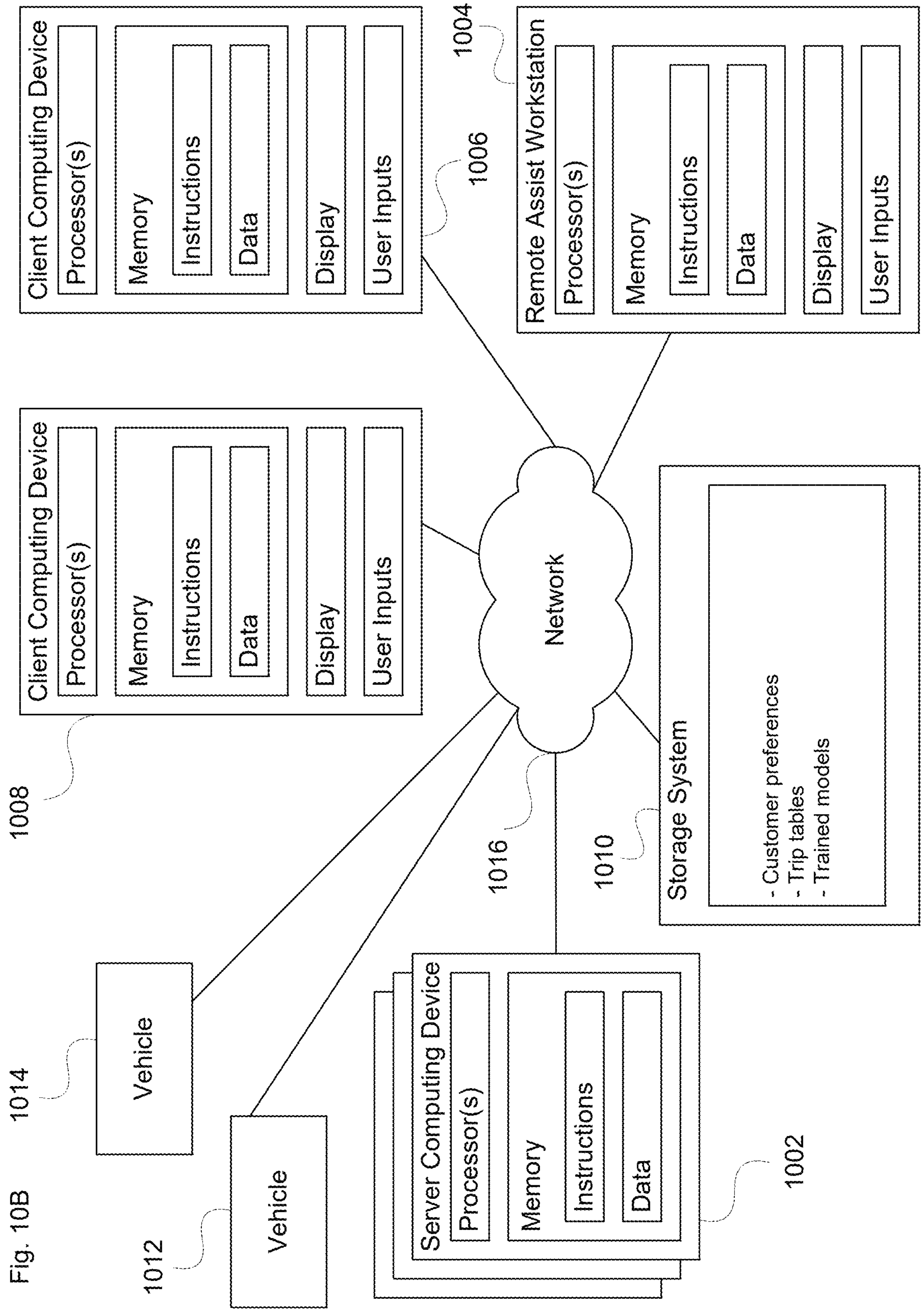
Fig. 10B
Client Computing Device
Processor(s)
Memory
Instructions
Data
Display
User Inputs
1006
Remote Assist Workstation
Processor(s)
Memory
Instructions
Data
Display
User Inputs
1004
Client Computing Device
Processor(s)
Memory
Instructions
Data
Display
User Inputs
1008
Network
1016
Storage System
- Customer preferences
- Trip tables
- Trained models
1010
Vehicle
1014
Vehicle
1012
Server Computing Device
Processor(s)
Memory
Instructions
Data
1002

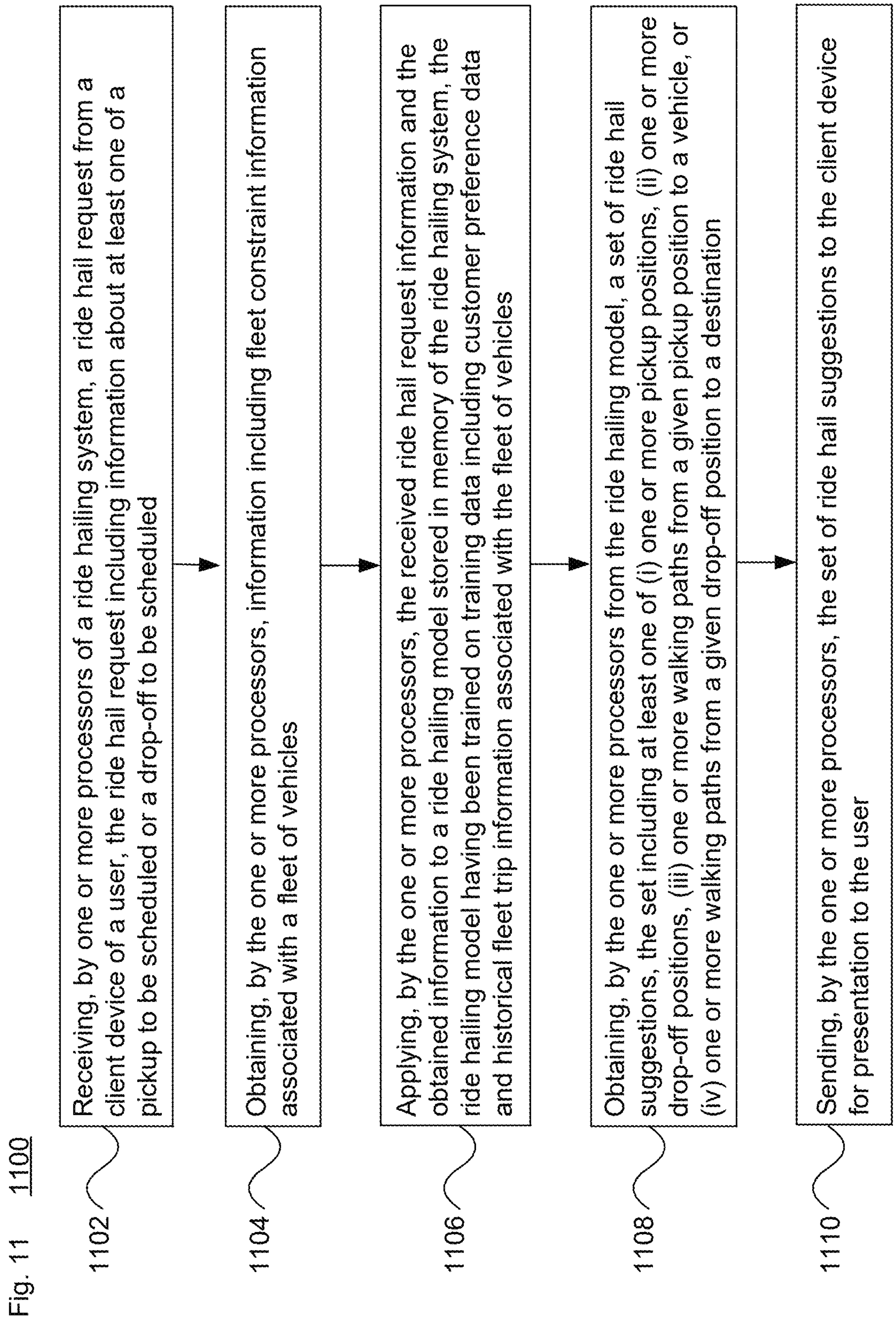
Fig. 11
1100
1102
Receiving, by one or more processors of a ride hailing system, a ride hail request from a client device of a user, the ride hail request including information about at least one of a pickup to be scheduled or a drop-off to be scheduled
1104
Obtaining, by the one or more processors, information including fleet constraint information associated with a fleet of vehicles
1106
Applying, by the one or more processors, the received ride hail request information and the obtained information to a ride hailing model stored in memory of the ride hailing system, the ride hailing model having been trained on training data including customer preference data and historical fleet trip information associated with the fleet of vehicles
1108
Obtaining, by the one or more processors from the ride hailing model, a set of ride hail suggestions, the set including at least one of (i) one or more pickup positions, (ii) one or more drop-off positions, (iii) one or more walking paths from a given pickup position to a vehicle, or (iv) one or more walking paths from a given drop-off position to a destination
1110
Sending, by the one or more processors, the set of ride hail suggestions to the client device for presentation to the user

ENHANCED RIDE HAILING SERVICES AND SYSTEMS

CROSS REFERENCE TO RELATED APPLICATIONS

The present application claims the benefit of and priority to U.S. Provisional Application No. 63/476,761, filed Dec. 22, 2022, the entire disclosure of which is hereby incorporated herein by reference.

BACKGROUND

Autonomous vehicles, for instance, vehicles that do not require a human driver in certain (or all) driving situations, can be used to aid in the transport of passengers or items from one location to another. Such vehicles may operate in a fully autonomous mode where customers may provide some initial input, such as requesting a pickup or destination location, and the vehicle maneuvers itself to that location without needing further customer input. When using ride-sharing or other ride-hailing services, customers may know where they want to go and when they want to get there. While they may have a sense for how long it should take to get to a destination, knowing when to hail a ride can be challenging. If the customer waits until too long, they may not be able to get a vehicle in time to get to their destination when they need to arrive. In other situations, cost may be the overriding factor for a customer, such as to avoid surge pricing during busy periods, e.g., rush hour. Thus, customers may hail rides based on limited information, which may impact when the get to their destinations. It may also adversely affect fleet management.

BRIEF SUMMARY

The technology relates to ride scheduling and planning. While typical ride-hailing apps may focus on getting riders to hail right away, they do not help people decide when to hail. Hailers may use competing services and mapping apps before hailing, for instance to get a sense of travel times, prices, and time to pickup. They then can choose the best time or price option, even if none of the options are ideal for their needs.

User preferences and back-end fleet management factors can greatly impact when and how rides may be scheduled. People may want flexibility in riding, which may be faster than public transportation and may have a lower cost than conventional ride hailing offerings. For instance, predictable, consistent locations and pickup times may be worth a short walk for the rider. In addition, knowing how the cost of a trip may vary at different times during the day may help set rider expectations, and enable them to select when to make certain trips (e.g., to avoid surge pricing), such as going to the grocery store or to pick up dry cleaning. In view of this, as discussed herein a system is provided that is able to evaluate different aspects for a trip, including the type of destination, routing, time of day, rider preferences and other factors, and can curate relevant information to provide enhanced hailing-related information to customers.

According to one aspect, a method is provided that comprises: receiving, by one or more processors of a ride hailing system, a ride hail request from a client device of a user, the ride hail request including information about at least one of a pickup to be scheduled or a drop-off to be scheduled; obtaining, by the one or more processors, information (which may be real-time information) including fleet constraint information associated with a fleet of vehicles; applying, by the one or more processors, the received ride hail request information and the obtained (real-time) information to a ride hailing model stored in memory of the ride hailing system, the ride hailing model having been trained on training data including customer preference data and historical fleet trip information associated with the fleet of vehicles; obtaining, by the one or more processors from the ride hailing model, a set of ride hail suggestions, the set including at least one of (i) one or more pickup positions, (ii) one or more drop-off positions, (iii) one or more walking paths from a given pickup position to a vehicle, or (iv) one or more walking paths from a given drop-off position to a destination; and sending, by the one or more processors, the set of ride hail suggestions to the client device for presentation to the user.

The method may further comprises: in response to sending the set of ride hail suggestions, receiving instructions to schedule the pickup or the drop-off; and scheduling the pickup or the drop-off with a particular vehicle of the fleet of vehicles that is configured to operate in an autonomous driving mode. Alternatively or additionally, the training data may further include at least one of environmental information or sensor information. Alternatively or additionally, the training data may further include crowd-sourced information, in which the crowd-sourced information comprises at least one of feedback from completed trips or aggregated drop-off preferences for one or more locations. Alternatively or additionally, the customer preference data may be specific to the user.

Alternatively or additionally, the method may further comprise: curating, by the one or more processors, the set of ride hail suggestions; wherein sending the set of ride hail suggestions involves sending the curated set of ride hail suggestions. The curating may include at least one of (i) discarding one or more suggestions from the set of ride hail suggestions, or (ii) prioritizing the set of ride hail suggestions. Here, the curating may include evaluating whether any of the suggestions in the set of ride hail suggestions matches up with a preference of the user. Alternatively or additionally, the curating may be performed according to positive or negative preferences associated with the ride hail request of the user.

Alternatively or additionally, the set of ride hail suggestions sent to the client device for presentation to the user may include an explanation to be presented to the user explaining why a given suggestion is being presented. Alternatively or additionally, the ride hail request may correspond to a recurring trip associated with the user. Here, sending the set of ride hail suggestions can include proposing to modify a date or time for a next occurrence of the recurring trip. Alternatively or additionally, the customer preference data may include global preference data associated with the user. Here, the ride hail request may include trip-specific preference data corresponding to the pickup to be scheduled or the drop-off to be scheduled.

Alternatively or additionally, the set of ride hail suggestions may be obtained according to an optimization according to a set of factors including one or more of time, cost or rider discomfort. Alternatively or additionally, the method may further comprise dispatching a selected vehicle from the fleet of vehicles to perform the pickup or the drop-off, wherein the selected vehicle is configured to operate in an autonomous driving mode.

According to another aspect, a ride hailing system is provided that comprises: memory configured to store a ride hailing model in memory, the ride hailing model having been trained on training data including customer preference data and historical fleet trip information associated with a fleet of vehicles; and one or more processors operatively coupled to the memory. The one or more processors are configured to: receive a ride hail request from a client device of a user, the ride hail request including information about at least one of a pickup to be scheduled or a drop-off to be scheduled; obtain information (which may comprise real-time information) including fleet constraint information associated with the fleet of vehicles; apply the received ride hail request information and the obtained real-time information to the ride hailing model; obtain, from the ride hailing model, a set of ride hail suggestions, the set including at least one of (i) one or more pickup positions, (ii) one or more drop-off positions, (iii) one or more walking paths from a given pickup position to a vehicle, or (iv) one or more walking paths from a given drop-off position to a destination; and send the set of ride hail suggestions to the client device for presentation to the user.

Alternatively or additionally, in response to sending the set of ride hail suggestions, the one or more processors are further configured to receive instructions to schedule the pickup or the drop-off. Here, the one or more processors are further configured to schedule the pickup or the drop-off with a particular vehicle of the fleet of vehicles that is configured to operate in an autonomous driving mode. Alternatively or additionally, the one or more processors may be further configured to: curate the set of ride hail suggestions; and send the curated set of ride hail suggestions as the set of ride hail suggestions. Here, curation may include at least one of (i) discard one or more suggestions from the set of ride hail suggestions, or (ii) prioritize the set of ride hail suggestions.

Alternatively or additionally, the ride hail request may corresponds to a recurring trip associated with the user. In this case, the one or more processors are configured to send the set of ride hail suggestions with a proposal to modify a date or time for a next occurrence of the recurring trip. Alternatively or additionally, the one or more processors may be further configured to dispatch a selected vehicle from the fleet of vehicles to perform the pickup or the drop-off, wherein the selected vehicle is configured to operate in an autonomous driving mode.

BRIEF DESCRIPTION OF THE DRAWINGS

FIGS. 10A-B illustrate an example system in accordance with aspects of the technology.

FIG. 11 illustrates an example method in accordance with aspects of the technology.

DETAILED DESCRIPTION

In order to effectively perform pickups and drop-offs with an autonomous vehicle, the system may leverage not only user preferences, but also the knowledge and control that a fleet management system has over its autonomous vehicles. Being able to manage each vehicle's trips and knowing real-time and prospective availability for the fleet as a whole, the system can accurately identify not only trip costs, but estimated times of arrival (ETAs) and estimated times of departure (ETDs). This can greatly assist riders with trip planning by providing the most relevant data that enables riders to make informed trip decisions that address their needs. Otherwise, riders and other customers would simply fall back to cost as the deciding factor for scheduling a trip when the convenience value to them is not clear.

Thus, sharing insight into both pricing and ETA/ETD over different pickup times offers customers a choice they would not otherwise have. Sharing this information around current and future hailing conditions may change hailing behavior. By way of example, future-forecasted hailing data may entice users to check the ride-hailing app earlier than when they need to leave by. This can reduce the burden or stress of planning future rides, both on customers and a ride hailing service. As discussed in detail below, the technology provides technical benefits by pairing predictive information with pickup time choices. An enhanced ride hailing app can support and select different types of information from numerous sources, selecting which information may be most applicable in the current situation, and present it in a clear manner to the customer.

Example Vehicle Systems

Figure 1A:
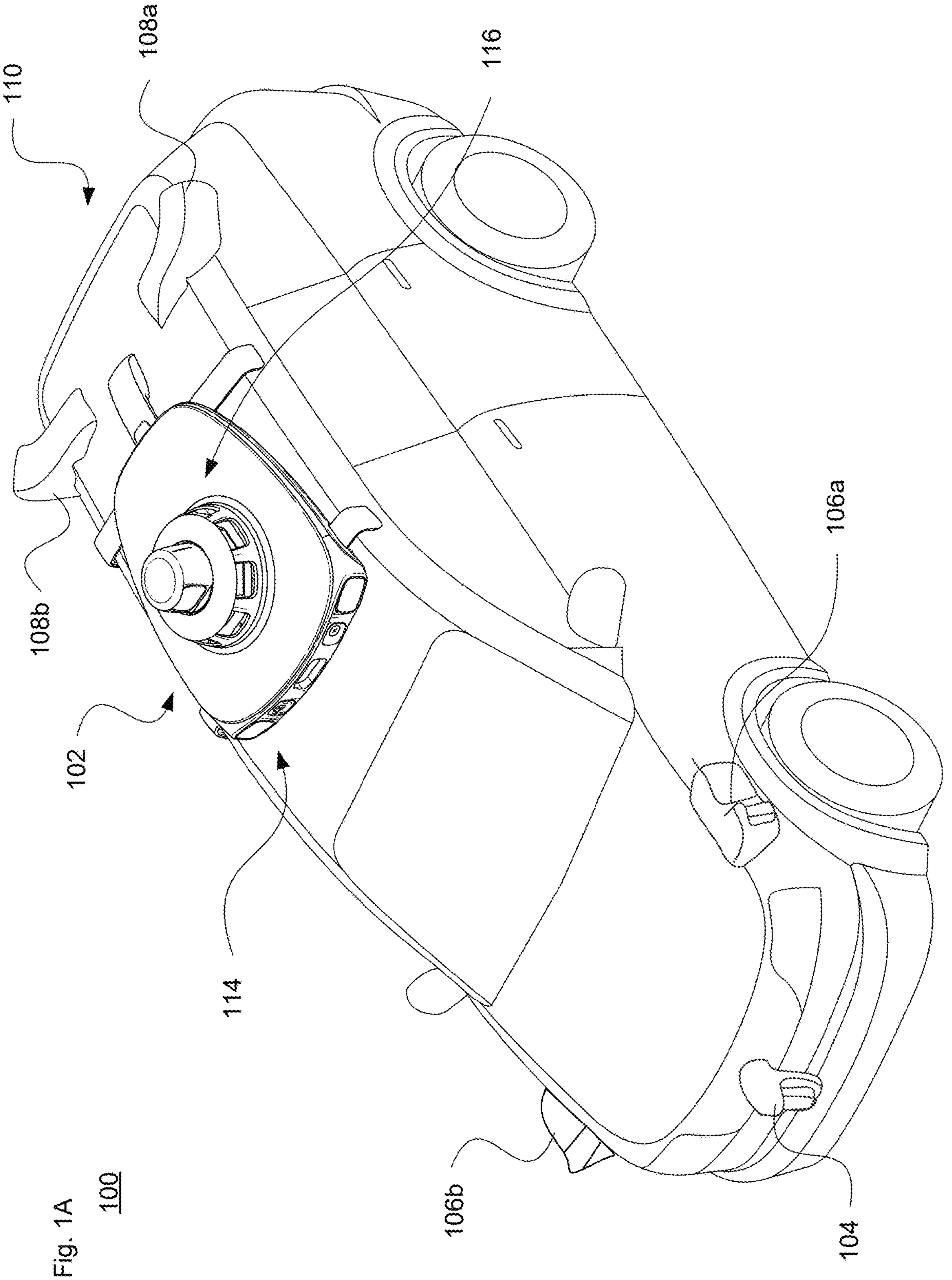
FIGS. 1A-B illustrate example self-driving vehicles in accordance with aspects of the technology.
Figure 1B:
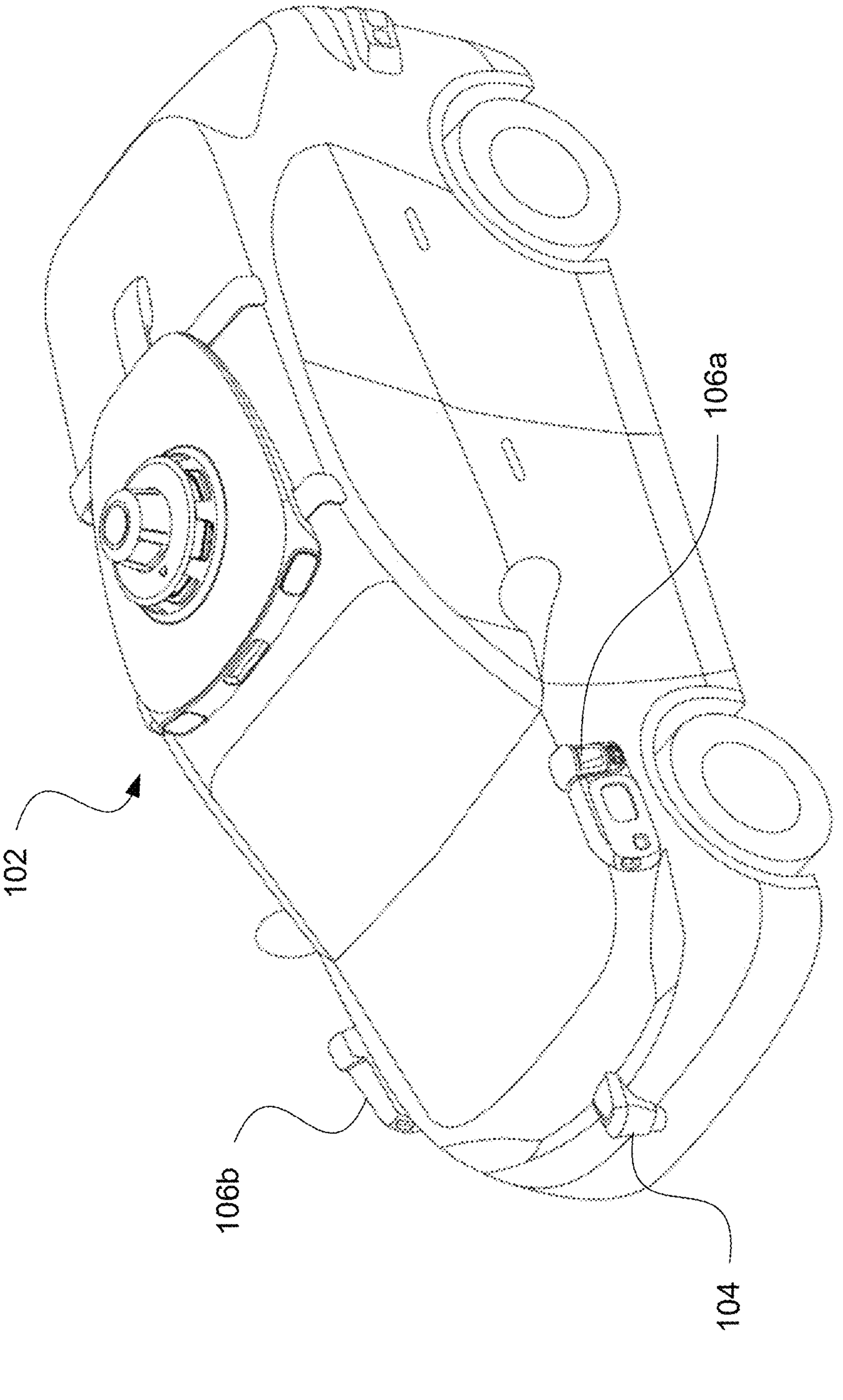
Figure 1C:
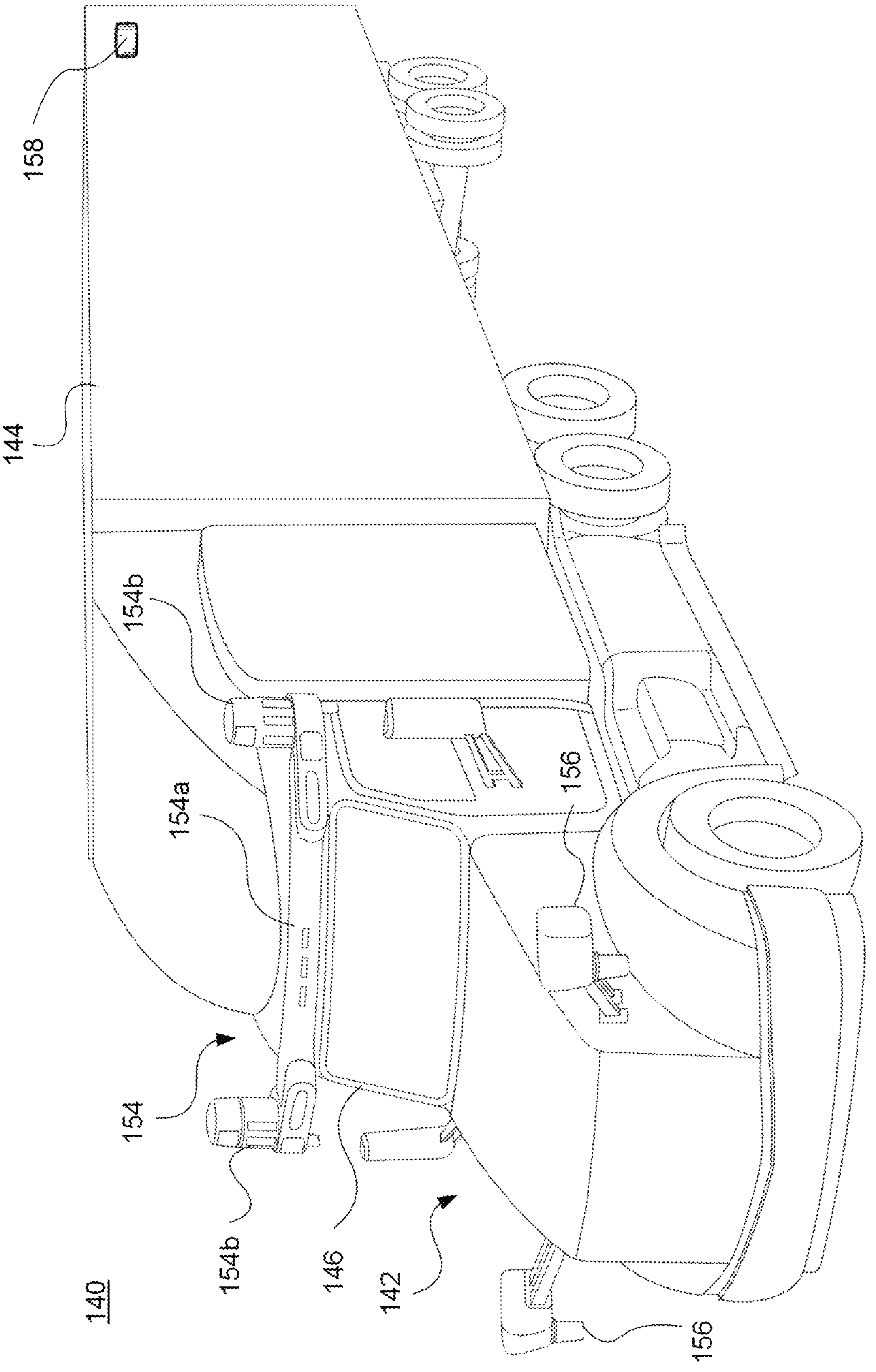
FIGS. 1C-E illustrate example cargo and delivery type vehicles configured for use with aspects of the technology.
Figure 1D:
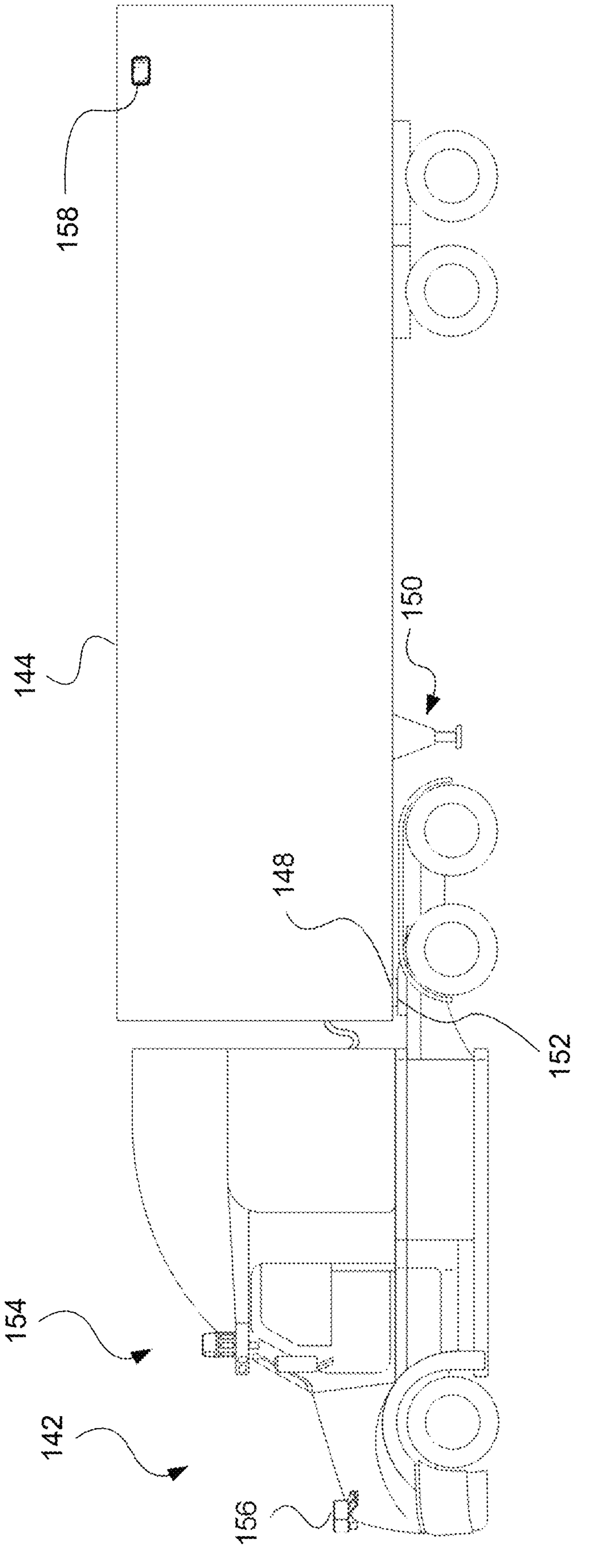
Figure 1E:
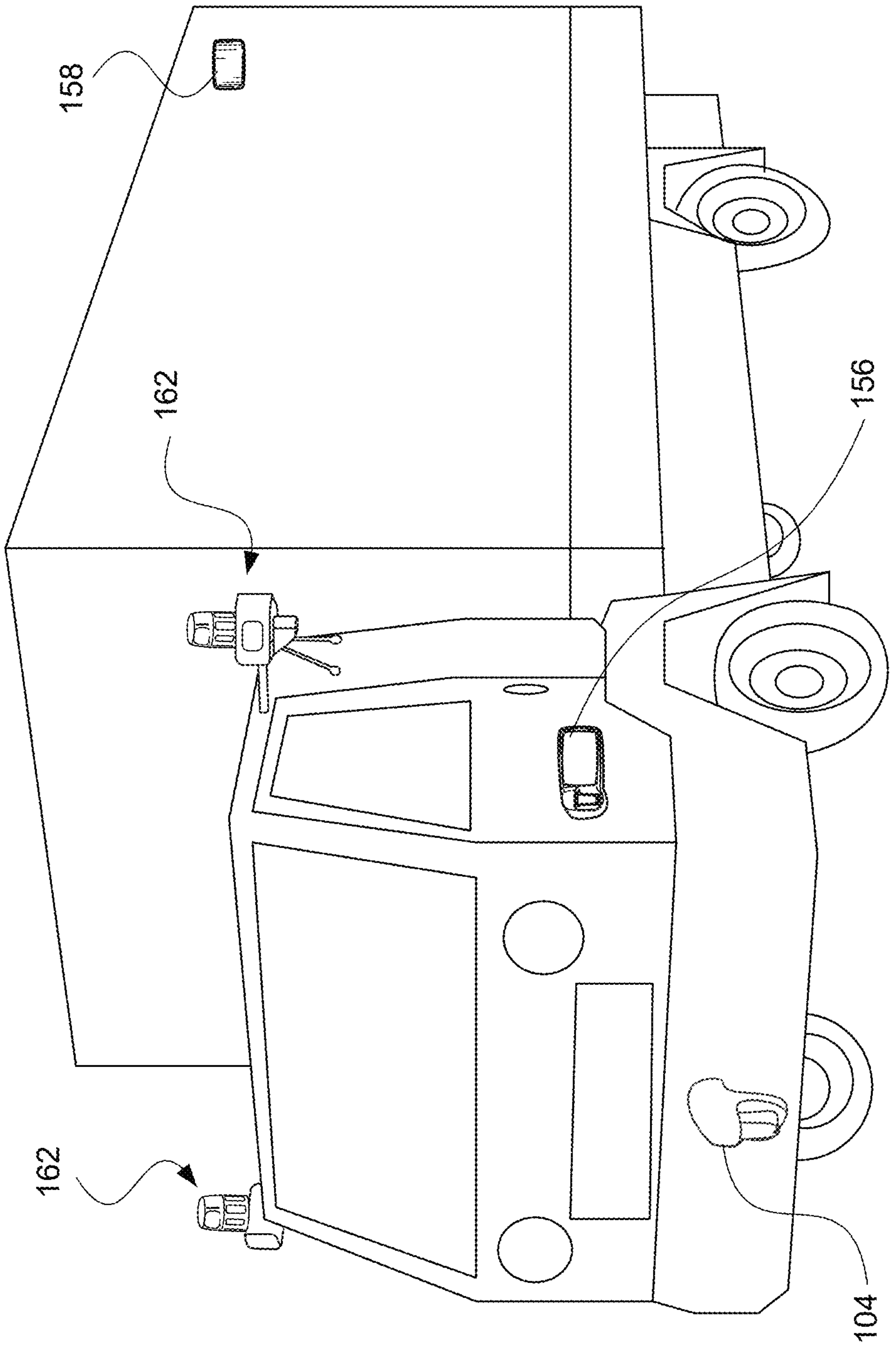

FIG. 1A illustrates a perspective view of an example passenger vehicle 100, such as a minivan or sport utility vehicle (SUV). FIG. 1B illustrates a perspective view of another example passenger vehicle 120, such as a sedan or crossover. The passenger vehicles may include various sensors for obtaining information about the vehicle's external environment. FIGS. 1C-D illustrate an example tractor-trailer type cargo vehicle 140. And FIG. 1E illustrates a smaller cargo vehicle 160, such as a panel truck for local deliveries.

Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each defined different levels of automated driving to indicate how much, or how little, a vehicle controls the driving, although different organizations may categorize the levels differently. For example, under current SAE classifications, there may be up to six levels (e.g., Level 0 through Level 5). In the lower SAE levels, the human driver is supported by various automated features such as emergency braking, blind spot or lane departure warning, lane centering and/or adaptive cruise control; however, the human driver must continuously oversee such features. In higher SAE levels, the human driver does not control certain (or all) driving features.

As described herein, in a semi or partially autonomous driving mode, even though the vehicle assists with one or more driving operations (e.g., steering, braking and/or accelerating to perform lane centering, adaptive cruise control, advanced driver assistance system (ADAS) or emergency braking), the human driver is expected to be situationally aware of the vehicle's surroundings and supervise the assisted driving operations. Here, even though the vehicle may perform all driving tasks in certain situations, the human driver is expected to be responsible for taking control as needed. In contrast, in a fully autonomous driving mode, the control system of the vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode. The technology may be employed in all manner of vehicles configured to operate in an autonomous driving mode, including vehicles that transport passengers or items such as food deliveries, packages, cargo, etc. While certain aspects of the disclosure are particularly useful in connection with specific types of vehicles, the vehicle may be any type of passenger or commercial vehicle including, but not limited to, cars (e.g., coupes, sedans, minivans, vans, sport utility vehicles, shuttles, etc.), trucks (e.g., light duty such as classes 1-3, medium duty such as classes 4-6, and heavy duty trucks such as classes 7-8), motorcycles, buses, recreational vehicles, or special purpose vehicles (e.g., low speed vehicles such as trams or golf cars, street cleaning or sweeping vehicles, garbage trucks, emergency vehicles, etc.).

For instance, as shown in FIG. 1A, the vehicle may include a roof-top housing unit (roof pod assembly) 102 may include one or more lidar sensors as well as various cameras (e.g., optical or infrared), radar units, acoustical sensors (e.g., microphone or sonar-type sensors, ultrasonic sensors, or the like), inertial (e.g., accelerometer, gyroscope, etc.) or other sensors (e.g., positioning sensors such as GPS sensors). Housing unit 102 may have any number of different configurations, such as domes, cylinders, "cake-top" shapes, etc. Housing 104, located at the front end of vehicle 100, and housings 106*a*, 106*b* on the driver's and passenger's sides of the vehicle may each incorporate lidar, radar, camera, acoustical and/or other sensors. For example, housing 106*a* may be located in front of the driver's side door along a quarter panel of the vehicle. As shown, the passenger vehicle 100 also includes housings 108*a*, 108*b* for, e.g., radar units, lidar and/or cameras also located towards the rear roof portion of the vehicle. Additional lidar, radar units and/or cameras (not shown) may be located at other places along the vehicle 100. For instance, arrow 110 indicates that a sensor unit (not shown) may be positioned along the rear of the vehicle 100, such as on or adjacent to the bumper. Depending on the vehicle type and sensor housing configuration(s), acoustical sensors may be disposed in any or all of these housings around the vehicle.

In this example, arrow 114 indicates that the roof pod 102 as shown includes a base section coupled to the roof of the vehicle. And arrow 116 indicated that the roof pod 102 also includes an upper section (e.g., with the dome, cylinder or cake-top shape) raised above the base section. Each of the base section and upper section may house different sensor units configured to obtain information about objects and conditions in the environment around the vehicle. The roof pod 102 and other sensor housings may also be disposed along vehicle 120 of FIG. 1B. By way of example, each sensor unit may include one or more sensors of the types described above, such as lidar, radar, camera (e.g., optical or infrared), acoustical (e.g., a passive microphone or active sound emitting sonar-type sensor), inertial (e.g., accelerometer, gyroscope, etc.) or other sensors (e.g., positioning sensors such as GPS sensors).

The example cargo vehicle 140 of FIGS. 1C-D is a tractor-trailer truck, e.g., a class 7 or class 8 vehicle based on gross vehicular weight rating (GVWR). The truck may include, e.g., a single, double or triple trailer, or may be another medium or heavy-duty truck such as in commercial weight classes 4 through 8. As shown, the truck includes a tractor unit 142 and a single cargo unit or trailer 144. The trailer 144 may be fully enclosed, open such as a flat bed, or partially open depending on the type of goods or other cargo to be transported. In this example, the tractor unit 142 includes the engine and steering systems (not shown) and a cab 146 for a driver and any passengers.

As seen in the side view of FIG. 1D, the trailer 144 includes a hitching point, known as a kingpin, 148, as well as landing gear 150 for when the trailer is detached from the tractor unit. The kingpin 148 is typically formed as a solid steel shaft, which is configured to pivotally attach to the tractor unit 142. In particular, the kingpin 148 attaches to a trailer coupling 152, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor may have one or more sensor units 154 and 156 disposed therealong. For instance, sensor unit 154 may be disposed on a roof or top portion of the cab. The sensor unit 154 may be a sensor suite having an elongated central member 154*a* with one or more types of sensors located therealong (e.g., camera and/or radar modules) and side members 154*b* that may include other sensor types (e.g., short range lidar modules capable of detecting objects within 10-25 meters of the vehicle and/or long range lidar modules capable of detecting objects beyond 15-20 meters and up to 100-250 meters). Sensor units 156 may be disposed on left and/or right sides of the cab. Sensor units may also be located along other regions of the cab, such as along the front bumper or hood area, in the rear of the cab, adjacent to the fifth-wheel, underneath the chassis, etc. The trailer 144 may also have one or more sensor units 158 disposed therealong, for instance along one or both side panels, front, rear, roof and/or undercarriage of the trailer 144.

The perspective view 160 of FIG. 1E illustrates an example panel truck or other vehicle that may be suitable for local deliveries (e.g., groceries, meals, mail or other packages, etc.), such as a light truck in classes 1-3 or a medium truck in classes 4-6 based on GVWR. Here, in contrast to the roof-top housing unit 154 shown in FIGS. 1C-D, the truck 160 may have a pair of sensor assemblies disposed in housings 162 on either side of the vehicle.

As with the sensor units of the passenger vehicles of FIGS. 1A-B, each sensor unit of the truck may include one or more sensors, such as lidar, radar, camera (e.g., optical or infrared), acoustical (e.g., microphone or sonar-type sensor), inertial (e.g., accelerometer, gyroscope, etc.) or other sensors such as geolocation-based (e.g., GPS) positioning sensors, load cell or pressure sensors (e.g., piezoelectric or mechanical), inertial (e.g., accelerometer, gyroscope, etc.).

Figure 2:
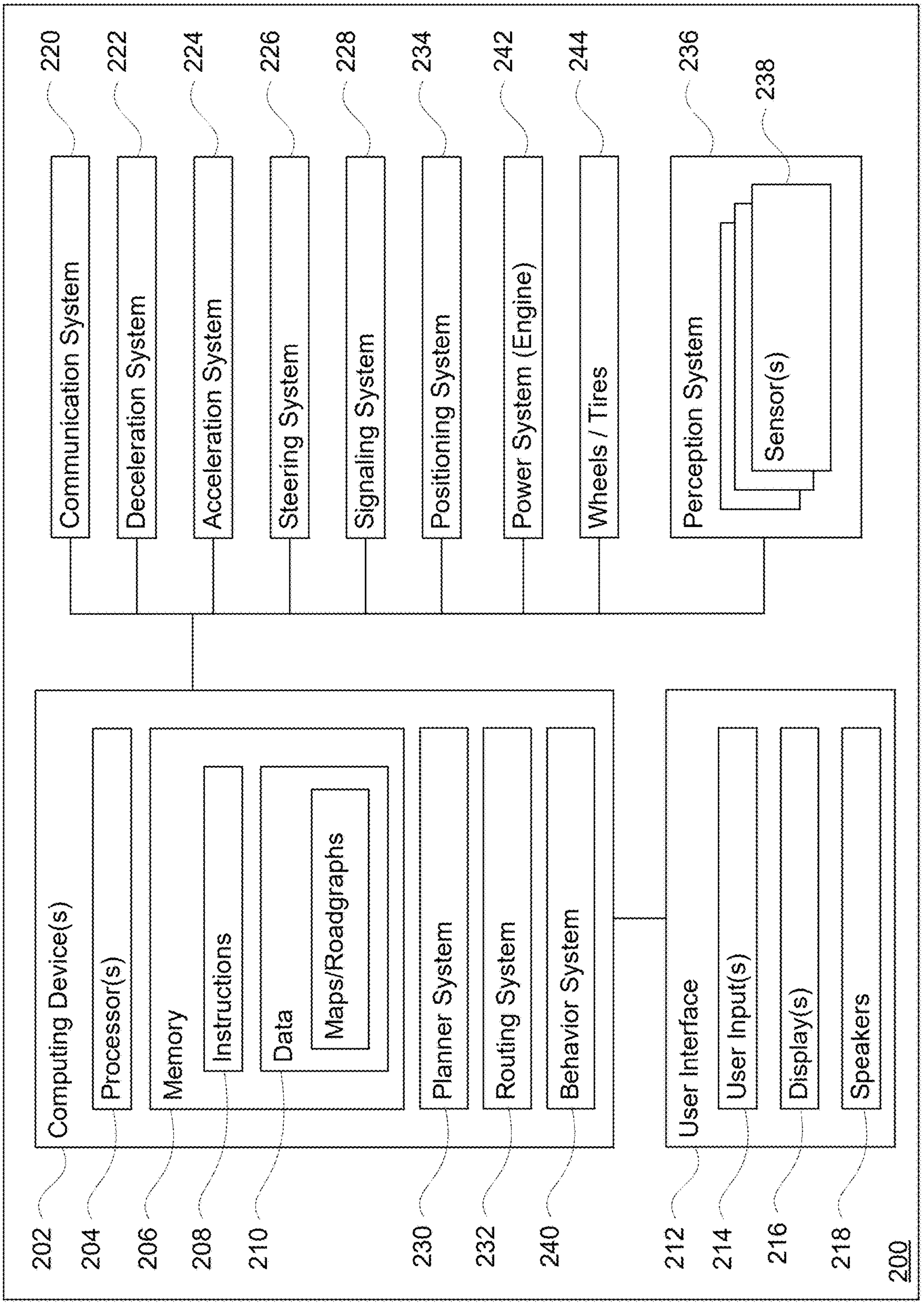
FIG. 2 illustrates components of a self-driving vehicle in accordance with aspects of the technology.

As shown in system diagram 200 of FIG. 2, the vehicle such as vehicle 100, 120 or 160 may have one or more computing devices, such as computing device 202 containing one or more processors 204, memory 206 and other components typically present in general purpose computing devices.

The memory 206 stores information accessible by the one or more processors 204, including and instructions 208 and data 210 that may be executed or otherwise used by the processor(s) 204. The memory 206 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 210 may be retrieved, stored or modified by processor 204 in accordance with the instructions 208. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 204 may be any conventional processors, such as commercially available CPUs, GPUs or TPUs. Alternatively, the one or more processors may include a dedicated device such as an ASIC or other hardware-based processor. Although FIG. 2 functionally illustrates the processor, memory, and other elements of computing device 202 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 202. Accordingly, references to a processor or computing device will be understood to include references to a collection of processors or computing devices or memories that may or may not operate in parallel.

Computing devices 202 may include all of the components normally used in connection with a computing device such as the processor and memory described above as well as a user interface 212 having one or more user inputs 214 (e.g., one or more of a button, mouse, keyboard, touch screen, gesture input and/or microphone), various electronic displays 216 (e.g., a monitor having a screen or any other electrical device that is operable to display information), and speakers 218 to provide information to a passenger of the autonomous vehicle or other people as needed. For example, electronic display 216 may be located within a cabin of autonomous vehicle 100, 120 or 160 and may be used by computing devices 202 to provide information to passengers or delivery personnel within the autonomous vehicle 100, 120 or 160.

Computing devices 202 may also include a communication system 220 having one or more wireless connections to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 202 may be part of an autonomous control system for the autonomous vehicle 100, 120 or 160 and may be capable of communicating with various components of the vehicle in order to control the vehicle in an autonomous driving mode. For example, computing devices 202 may be in communication with various systems of autonomous vehicle 100, 120 or 160, such as deceleration system 222, acceleration system 224, steering system 226, signaling system 228, planning system 230 (also referred to as a planning/trajectory module), routing system 232, positioning system 234 (for determining the position of the vehicle such as its pose, e.g., position and orientation along the roadway or pitch, yaw and roll of the vehicle chassis relative to a coordinate system), perception system 236 having one or more sensors 238, behavior modeling system 240 (also referred to as a behavior module), and power system 242 in order to control the movement, speed, etc. of autonomous vehicle 100, 120 or 160 in accordance with the instructions 208 of memory 206 in the autonomous driving mode.

As an example, computing devices 202 may interact with deceleration system 222 and acceleration system 224 in order to control the speed of the vehicle. Similarly, steering system 226 may be used by computing devices 202 in order to control the direction of autonomous vehicle 100, 120 or 160. For example, if autonomous vehicle 100, 120 or 160 is configured for use on a road, such as a car or truck, steering system 226 may include components to control the angle of wheels 244 to turn the vehicle. Some or all of the wheels/tires 244 are coupled to deceleration, acceleration and/or steering systems. The computing devices 202 may be able to receive information about tire pressure, balance and other factors that may impact driving in an autonomous mode. Computing devices 202 may also use the signaling system 228 in order to signal the vehicle's intent to other drivers or vehicles, for example, by lighting turn signals or brake lights when needed.

Routing system 232 may be used by computing devices 202 in order to generate a route to a destination using map information. Planning system 230 may be used by computing device 202 in order to generate short-term trajectories that allow the vehicle to follow routes generated by the routing system. In this regard, the planning system 230 and/or routing system 232 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device, as such as the computing devices discussed below or other computing devices), pullover spots, vegetation, or other such objects and information.

The map information may be configured as a roadgraph. The roadgraph may include a plurality of graph nodes and edges representing features such as crosswalks, traffic lights, road signs, road or lane segments, etc., that together make up the road network of the map information. Each edge is defined by a starting graph node having a specific geographic location (e.g., latitude, longitude, altitude, etc.), an ending graph node having a specific geographic location (e.g., latitude, longitude, altitude, etc.), and a direction. This direction may refer to a direction the autonomous vehicle 100 must be moving in in order to follow the edge (i.e., a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

In addition to such roadgraph information, the system may store other curated map information associated with pickup or drop-off locations. This can include annotated roadgraph information. By way of example, the curated map information may identify the locations of handicap parking spaces or other specialty parking spaces (e.g., expectant mother parking, electric vehicle parking, limited time parking, permit parking, carpool parking, visitor parking, etc.). In an apartment complex or campus with multiple buildings, the curated map information may identify a leasing office, visitor building or other point of interest. Other types of curated map information may include locations for covered parking, residential driveways, passenger loading zones, preferred pullover zones, unmapped region driveways (e.g., vacant lots with driveways), or other locations where parking may be permissible for at least a short duration (e.g., on the order of 5-30 minutes).

The routing system 232 may use the aforementioned map information to determine a route from a current location (e.g., a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g., because it is faster) and therefore be preferable.

Positioning system 234 may be used by computing devices 202 in order to determine the vehicle's relative or absolute position on a map or on the earth. For example, the positioning system 234 may include a GPS receiver or to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of a roadgraph as well as relative location information, such as location relative to other cars immediately around it, which can often be determined with less noise than the absolute geographical location.

The positioning system 234 may also include other devices in communication with computing devices 202, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 236 includes one or more components (sensors 238) for detecting objects external to the vehicle such as other road users (vehicles, pedestrians, bicyclists, etc.) obstacles in the roadway, traffic signals, signs, trees, buildings, etc. For example, the sensors 238 of the perception system 236 may include lidar, sonar, radar, cameras, microphones (e.g., in an acoustical array for instance arranged along the roof pod 102), pressure or inertial sensors, strain gauges, and/or any other detection devices that generate and/or record data which may be processed by the computing devices of computing devices 202. In the case where the vehicle is a passenger vehicle such as a minivan 100 or car 120, the vehicle may include lidar, cameras, and/or other sensors mounted on or near the roof, fenders, bumpers or other locations as shown in FIGS. 1A-B.

Such sensors of the perception system 236 may detect objects in the vehicle's external environment and their characteristics such as location, orientation (pose) relative to the roadway, size, shape, type (for instance, vehicle, pedestrian, bicyclist, etc.), heading, speed of movement relative to the vehicle, etc., as well as environmental conditions around the vehicle. The perception system 236 may also include other sensors within the vehicle to detect objects and conditions within the vehicle, such as in the passenger compartment or storage compartment (e.g., trunk). For instance, such sensors may detect one or more persons, pets, packages, etc., as well as conditions within and/or outside the vehicle such as temperature, humidity, etc. Still further, sensors 238 of the perception system 236 may measure the rate of rotation of the wheels 244, an amount or a type of braking by the deceleration system 222, and other factors associated with the equipment of the vehicle itself.

The raw data obtained by the sensors (e.g., camera imagery, lidar point cloud data, radar return signals, acoustical information, etc.) can be processed by the perception system 236 and/or sent for further processing to the computing devices 202 periodically or continuously as the data is generated by the perception system 236. Computing devices 202 may use the positioning system 234 to determine the vehicle's location and perception system 236 to detect and respond to objects and roadway information (e.g., signage or road markings) when needed to reach the location safely, such as by adjustments made by planner/trajectory module 230, including adjustments in operation to deal with sensor occlusions and other issues.

In some instances, object characteristics may be input into a behavior prediction system software module of the behavior modeling system 240 which uses various behavior models based on object type to output one or more predicted future behaviors for a detected object. Object trajectories may be a list of positions and orientations or headings (e.g., poses) as well as other predicted characteristics such as speed, acceleration or deceleration, rate of change of acceleration or deceleration, etc. In other instances, the characteristics obtained from the perception system 236 may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle.

Detected objects, predicted future behaviors, various likelihoods from detection system software modules, the map information identifying the vehicle's environment, position information from the positioning system 234 identifying the location and orientation of the vehicle, a destination location or node for the vehicle as well as feedback from various other systems of the vehicle may be input into a planning system software module of the planner system 230. The planner system 230 may use this input to generate trajectories for the vehicle to follow for some brief period of time into the future based on a route generated by a routing module of the routing system 232. In this regard, the trajectories may define the specific characteristics of acceleration, deceleration, speed, direction, etc. to allow the vehicle to follow the route towards reaching a destination. A control system software module of computing devices 202 may be configured to control movement of the vehicle, for instance by controlling braking, acceleration and steering of the vehicle, in order to follow a trajectory.

The computing devices 202 may control the vehicle in one or more of the autonomous driving modes by controlling various components. For instance, by way of example, computing devices 202 may navigate the vehicle to a destination location completely autonomously using data from the detailed map information and planner system 230. Computing devices 202 may use the positioning system 234 to determine the vehicle's location and perception system 236 to detect and respond to objects when needed to reach the location safely. Again, in order to do so, computing device 202 and/or planner system 230 may generate trajectories and cause the vehicle to follow these trajectories, for instance, by causing the vehicle to accelerate (e.g., by supplying fuel or other energy to the engine or power system 242 by acceleration system 224), decelerate (e.g., by decreasing the fuel supplied to the engine or power system 242, changing gears, and/or by applying brakes by deceleration system 222), change direction (e.g., by turning the front or rear wheels of autonomous vehicle 100, 120 or 160 by steering system 226), and signal such changes (e.g., by lighting turn signals) using the signaling system 228. Thus, the acceleration system 224 and deceleration system 222 may be part of a drivetrain that includes various components between an engine of the vehicle and the wheels of the vehicle. Again, by controlling these systems, computing devices 202 may also control the drivetrain of the vehicle in order to maneuver the vehicle autonomously.

Figure 3A:
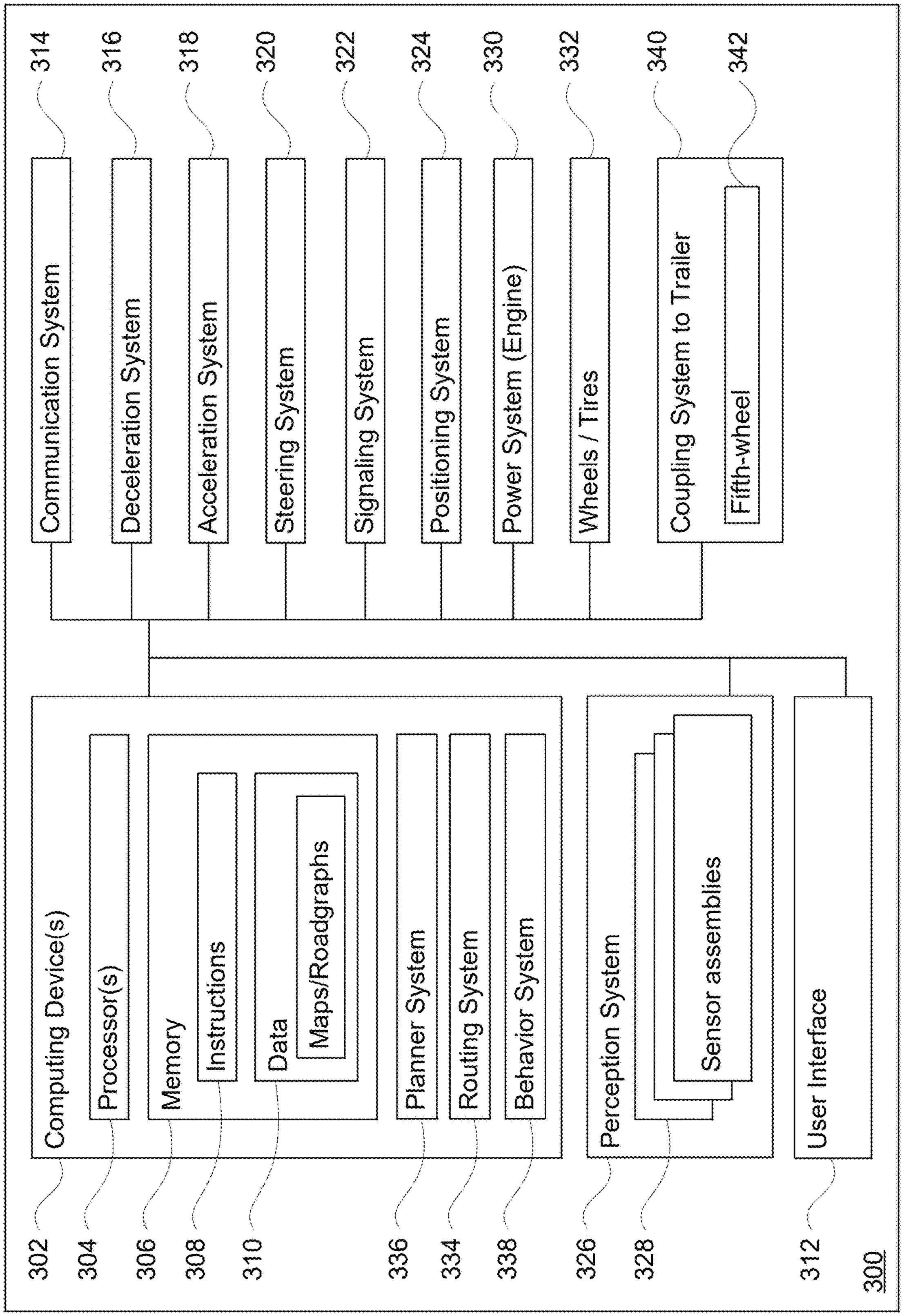
FIGS. 3A-B are block diagrams of systems of an example cargo-type vehicle in accordance with aspects of the technology.

FIG. 3A illustrates a block diagram 300 with various components and systems of a vehicle, e.g., vehicle 140 of FIGS. 1C-D. By way of example, the vehicle may be a heavy cargo truck, farm equipment or construction equipment, configured to operate in one or more autonomous modes of operation. As shown in the block diagram 300, the vehicle includes a control system of one or more computing devices, such as computing devices 302 containing one or more processors 304, memory 306 and other components similar or equivalent to components 202, 204 and 206 discussed above with regard to FIG. 2. For instance, the data may include map-related information (e.g., roadgraphs).

The control system may constitute an electronic control unit (ECU) of a tractor unit of a cargo vehicle. As with instructions 208, the instructions 308 may be any set of instructions to be executed directly (such as machine code) or indirectly (such as scripts) by the processor. Similarly, the data 310 may be retrieved, stored or modified by one or more processors 304 in accordance with the instructions 308. Here, as above, the system may include a user interface 312 having one or more user inputs, various electronic displays, and speakers.

In one example, the computing devices 302 may form an autonomous driving computing system incorporated into vehicle 140. Similar to the arrangement discussed above regarding FIG. 2, the autonomous driving computing system of block diagram 300 may be capable of communicating with various components of the vehicle in order to perform route planning and driving operations. Communication system 314 may provide one or more wireless connections in the manner described above for communication system 220. In addition or alternatively, the communication system may include the vehicle's internal communication bus (e.g., a Controller Area Network (CAN) bus or a FlexRay bus).

For example, the computing devices 302 may be in communication with various systems of the vehicle, such as a driving system including a deceleration system 316, acceleration system 318, steering system 320, signaling system 322, and a positioning system 324, each of which may function as discussed above regarding FIG. 2.

The computing devices 302 are also operatively coupled to a perception system 326 having one or more sensor assemblies 328, as well as a power system 330. Some or all of the wheels/tires 332 are coupled to the driving system, and the computing devices 202 may be able to receive information about tire pressure, balance, rotation rate and other factors that may impact driving in an autonomous mode. As with computing devices 202, the computing devices 302 may control the direction and speed of the vehicle by controlling various components. By way of example, computing devices 302 may navigate the vehicle to a destination location completely autonomously using data from the map information, routing system 334, planner system 336 and/or behavior system 338. For instance, computing devices 302 may employ a planner/trajectory module of the planner system 336 in conjunction with the positioning system 324, the sensor assemblies 328 of the perception system 326 and the routing system 334 to detect and respond to objects when needed to reach the location safely, similar to the manner described above for FIG. 2.

Similar to perception system 236, the perception system 326 also includes one or more sensors or other components such as those described above for detecting objects external to the vehicle, objects or conditions internal to the vehicle, and/or operation of certain vehicle equipment such as the wheels and driving system. Each sensor assembly 328 may include one or more sensors. In one example, a pair of sensor assemblies 328 may be arranged as sensor towers integrated into the side-view mirrors on the truck, farm equipment, construction equipment or the like. In another example, sensor assemblies 328 may also be positioned at different locations on the tractor unit 142 or on the trailer 144, as noted above with regard to FIGS. 1C-D. The computing devices 302 may communicate with the sensor assemblies located on both the tractor unit 142 and the trailer 144. Each assembly may have one or more types of sensors such as those described above.

Also shown in FIG. 3A is a coupling system 340 for connectivity between the tractor unit and the trailer. The coupling system 340 may include one or more power and/or pneumatic connections (not shown), and a fifth-wheel 342 at the tractor unit for mechanical connection to the kingpin at the trailer.

Figure 3B:
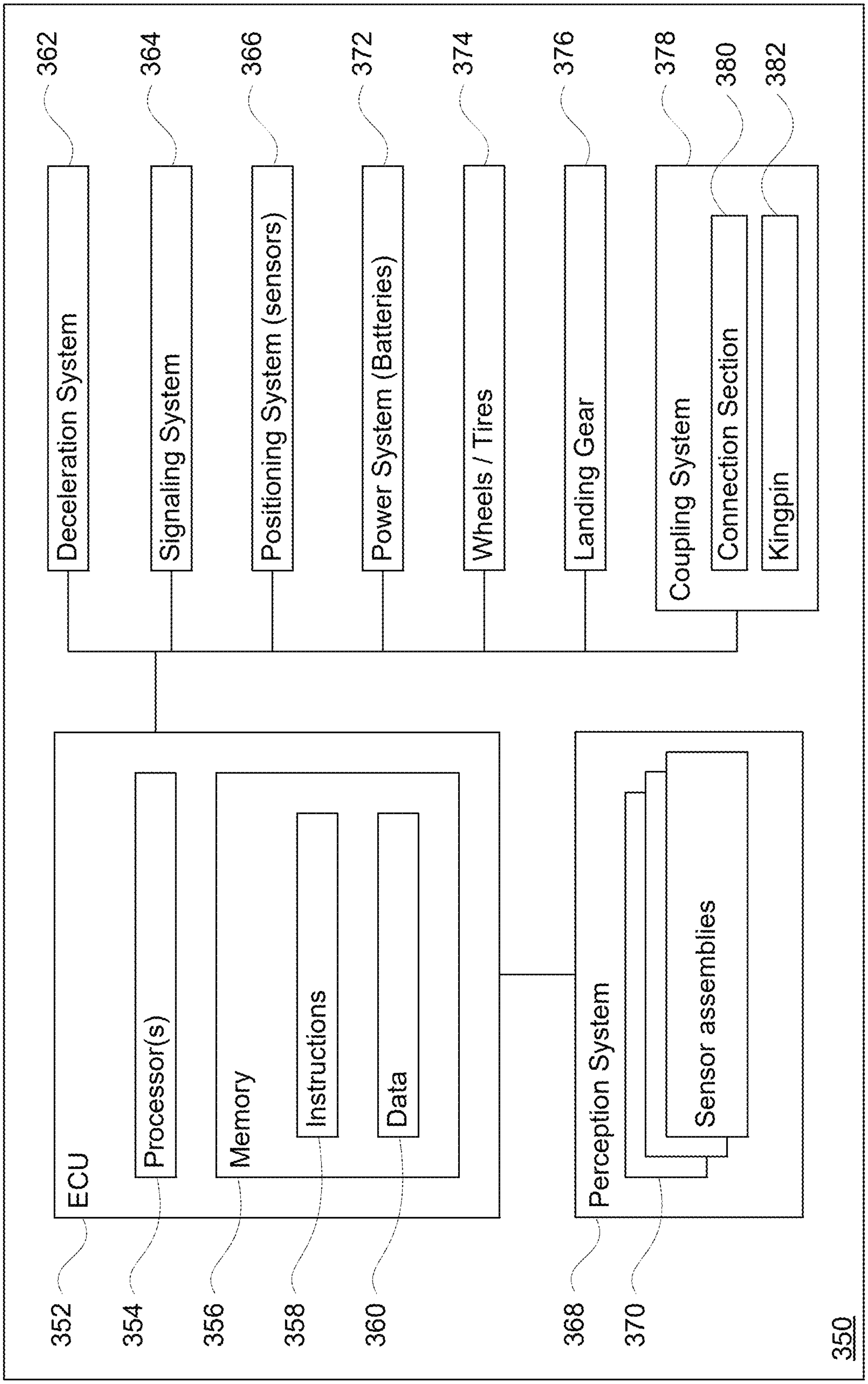

FIG. 3B illustrates a block diagram 350 of systems of an example trailer, such as trailer 144 of FIGS. 1C-D. As shown in this example, the system includes a trailer ECU 352 of one or more computing devices, such as computing devices containing one or more processors 354, memory 356 and other components typically present in general purpose computing devices. The memory 356 stores information accessible by the one or more processors 354, including instructions 358 and data 360 that may be executed or otherwise used by the processor(s) 354. The descriptions of the processors, memory, instructions and data from FIGS. 2 and 3A apply to these elements of FIG. 3B.

The trailer ECU 352 in this example is configured to receive information and control signals from the tractor unit, as well as information from various trailer components. The on-board processors 354 of the ECU 352 may communicate with various systems of the trailer, including a deceleration system 362, signaling system 364, and a positioning system 366. The ECU 352 may also be operatively coupled to a perception system 368 with one or more sensors arranged in sensor assemblies 370 for detecting objects in the trailer's driving environment. The ECU 352 may also be operatively coupled with a power system 372 (for example, a battery power supply) to provide power to local components. Some or all of the wheels/tires 374 of the trailer may be coupled to the deceleration system 362, and the processors 354 may be able to receive information about tire pressure, balance, wheel speed and other factors that may impact driving in an autonomous mode, and to relay that information to the processing system of the tractor unit. The deceleration system 362, signaling system 364, positioning system 366, perception system 368, power system 372 and wheels/tires 374 may operate in a manner such as described above with regard to FIGS. 2 and 3A.

The trailer also includes a set of landing gear 376, as well as a coupling system 378. The landing gear may provide a support structure for the trailer when decoupled from the tractor unit. The coupling system 378, which may be a part of coupling system 340 of FIG. 3A, provides connectivity between the trailer and the tractor unit. Thus, the coupling system 378 may include a connection section 380 (e.g., for communication, power and/or pneumatic links to the tractor unit). In this example, the coupling system also includes a kingpin 382 configured for connectivity with the fifth-wheel of the tractor unit.

Example Implementations and Scenarios

Aspects of the technology provide a technical benefit by pairing predictive information (e.g., about fleet availability, expected traffic, trip cost, etc.) with pickup/drop-off time choices. For instance, the system may evaluate timing for when it would be better to shop for groceries. This can include optimizing for time, cost and/or rider discomfort. The system may suggest trips by pulling forward future trips using predictive analytics including one or more of weather, demand, disengagement zones from an autonomous driving mode to manual driving, route restrictions, operational design domain changes, real-time or expected traffic, dynamic walking cost, etc. By way of example, the system may evaluate whether the vehicle can utilize roads that have steep grades (e.g., an incline or decline of greater than 12-20%), as that can open up new routes. In another example, given general traffic conditions or congestion at or near the selected drop-off location, if the customer wants to arrive at 7 pm, the system may recommend an earlier (or later pickup) than the customer's requested pickup time. Or if the grocery store frequented by the rider was associated with a particularly busy route during commute hours before an operational design domain change, and after such a change the open routes now provide a less congested option, this may enable the system to evaluate more time windows to suggest going to the grocery store. Thus, according to one aspect involving recurring trips, the system may provide a set of suggestions that includes a proposal to modify a date or time for a next occurrence of the recurring trip.

In order for a ride hailing service to support customers, it needs to understand the current status of its fleet, and should have access to information about near-term impacts due to requirements such as vehicle maintenance, recharging or refueling of vehicles, possible temporal restrictions (e.g., limits on left turns at an intersection during school hours, or no idling/parking on a particular street on certain days), the operational design domain, etc. By way of example, the operational design domain may encompass the area(s) in which vehicles are deployed (e.g., which part(s) of a city), the time of day (or season), the traffic conditions, the weather conditions, etc.

Figure 4:
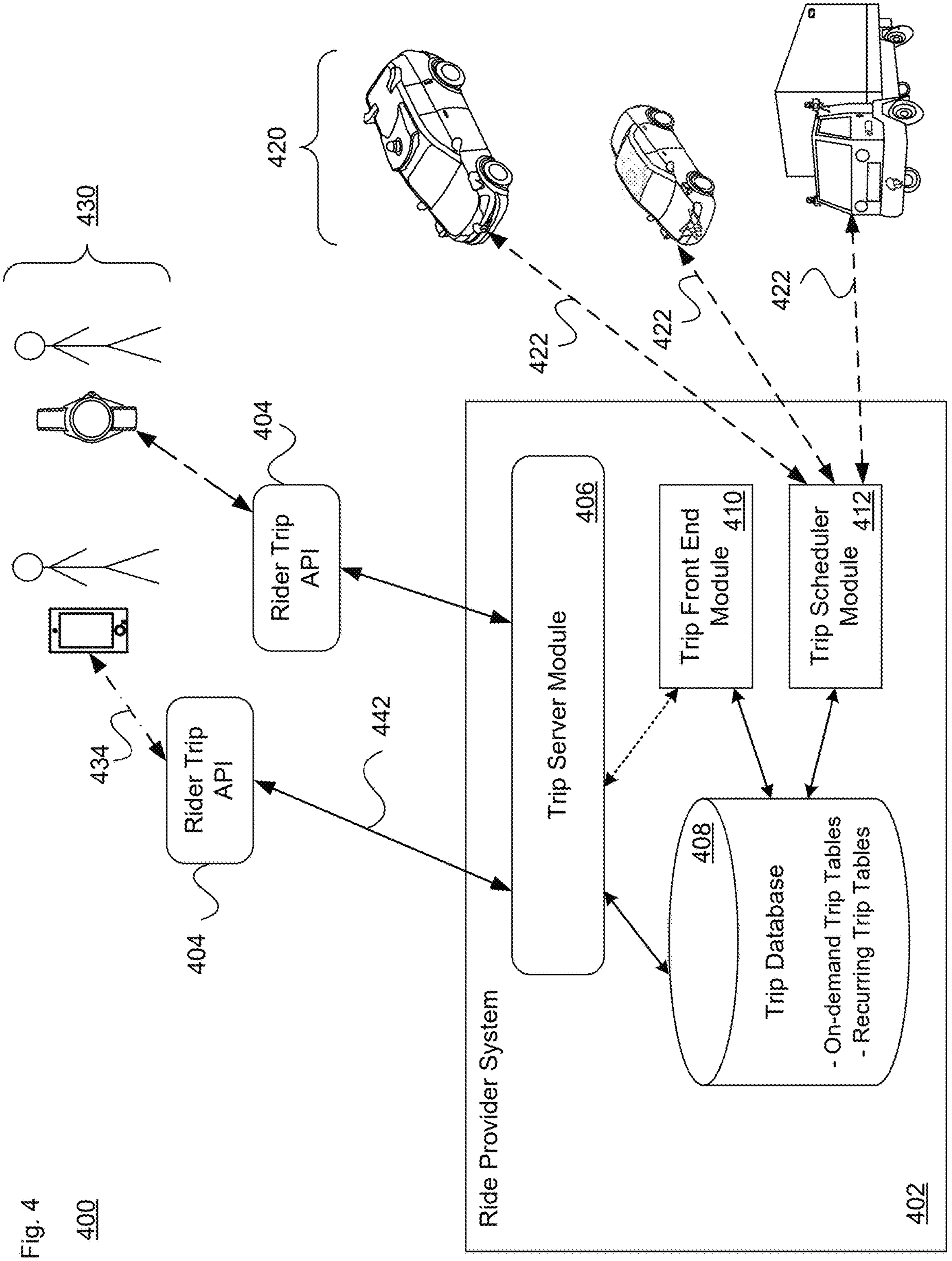
FIG. 4 illustrates an example ride hailing service in accordance with aspects of the technology.

FIG. 4 illustrates an arrangement 400 illustrating aspects of an example ride hailing service. In this example, ride provider system 402 is capable of communicating with a fleet 420 of autonomous vehicles (see dashed lines 422) and customers 430 (see elongated dash-dot line 432). For instance, the customers 430 may communicate directly with the ride provider system 402 via an app on the customer's mobile device. In this case, a rider trip application programming interface (API) 404 may be employed by the ride provider system 402 for communication with and actions involving a given customer.

As seen in FIG. 4, the ride provider system 402 may include a trip server module 406. This module may implement the rider trip API 404. A trip database 408 may include one or more trip tables for information associated with trips arranged with customers. For instance, there may be a set of on-demand trip tables created for individual rides requested by customer, and another set of recurring trip tables to handle multiple rides associated with particular customers (e.g., a weekly trip to the grocery store or to run other errands). In one example, these tables may be distinct. In another example, the tables may be different records or fields in a common or shared database. Other configurations are also possible. The trip database 408 is in operative communication with the trip server module 406. The trip database is also in operative communication with a trip front end module 410 and/or a trip scheduler module 412.

By way of example only, the trip scheduler module 412 may coordinate with the autonomous vehicles of the fleet, while the trip front end module 410 coordinates communication with the trip server module 406. More particularly, the trip front end module 410 is configured to react to a user's (e.g., a customer's) requests, such as asking to initiate a new trip or requesting information about the current trip. In the former case, the trip front end module 410 is configured to record a new trip request in the database. In the latter case, the trip front end module 410 is configured to read the current status of the trip and send it back to the requester. The trip scheduler module 412 is configured to decide which vehicle to assign to which trip, and communicates with the corresponding vehicles to have them serve the trips. The modules of the ride provider system 402 may be processes, routines or programs executed by one or more processors of the ride hailing system. Alternatively, the modules may include the processors of the system themselves (such as a set of CPUs or TPUs in a distributed processing system, described further below).

The rider trip API may support a number of different operations that can be used for fleet management by the system and/or to provide relevant information to the customer to set up and manage trips. For instance, the API operations may include estimating a time until pickup, proposing a trip plan, creating a trip, canceling a trip, requesting callback support, creating trip feedback, and user control over vehicle features (e.g., unlocking the doors). This set of API operations is not limiting, and other operations may be included or certain ones omitted. Examples of these operations are discussed below.

Estimating the time to pickup involves a request for the ride provider system to give an estimate to the customer of how long it would take for an autonomous vehicle to get to an identified pickup point. This information can be provided accurately (e.g., within 2-5 minutes of the actual pickup), because the ride provider system decides which vehicle to dispatch to which customer. The query may include latitude and longitude information or other coordinate data for the pickup location. The response may be a time in minutes or seconds. Error details can be included in the response, such as no vehicles available, the pickup location is not within the service area, or some other reason why a time to pickup cannot be estimated.

Proposing a trip plan is an API for which the ride provider system returns an estimate of how long it would take for a selected autonomous vehicle to get to a pickup point. The propose trip plan allows for negotiations regarding pickup and drop-off spots. Here, proposed waypoints may differ from what the customer originally requested, which can be due to the ability of the autonomous vehicle to reach a particular location, or other considerations that may lead to a more optimal trip. By way of example, if a given street is congested with traffic, is a one-way street, has limited access to a sidewalk or pullover spot, etc., the ride provider system may suggest an alternative pickup or drop-off point. The query for proposing a trip plan may contain one or two waypoints (e.g., pickup point and drop-off location). If only one waypoint is included, it is assumed to be the pickup point. The response may describe a fare (cost), time estimate(s) and other details for the proposed trip, which may form a trip proposal token.

Creating a trip is an API call used to actually request a trip. This would follow an earlier propose trip plan. Here, a request for create trip may include a proposal token returned by the propose trip plan. The proposal token can be time limited (e.g., within a 5-30 minute window, no longer than 60 minutes, etc.). Thus, the system may temporarily reserve a trip for the duration of the time window. The service provider (ride provider system) would be bound by the estimate returned in that earlier call. The create trip response includes a trip identifier, aka trip name such as "trips/ABqw93bx02". The trip identifier can be used in all subsequent requests dealing with that trip, such as when a customer asks for an update about the trip, or requests to change the drop-off location. This API call may include a trip proposal token obtained from the result of the proposing trip plan. The response may include the details of a created trip (including a trip identifier), or an error indication. For instance, if the time limit has expired, a trip already exists for the customer, or some other issue arose, the response can include such information.

Canceling a trip is an API call that requests cancellation of a trip. The request contains the trip name (returned by an earlier call to creating the trip), identifying the trip to cancel. Upon receiving a cancel trip request, the server (e.g., the trip server module of the ride provider system) will communicate with the assigned vehicle (if any) to inform it about the cancellation. In one example, if the vehicle is still on its way to the pickup, it may just abandon the trip immediately, for instance returning to a depot or other service center. However, if the cancellation occurs while the customer is in the vehicle, then the vehicle will try to find a suitable spot to pull over and let the customer out. The input is a request for cancellation, which includes a resource name identifying the trip. However, because the request must be sent to the vehicle, and the vehicle may need to pull over to let the customer out, cancellation may not take effect immediately. Thus, the trip status may not update until this happens. An error message may be returned if no such trip exists, or if the trip exists but is no longer active.

Once a trip has been scheduled, the API may allow the user to pause (or snooze) a trip, which allows the rider to delay a pickup for an active trip. This may be considered to be micro-scheduling for an existing trip. Thus, if something unexpected comes up and the rider is running late or needs a few extra minutes to get to the pickup spot, they can snooze the ride. Depending on vehicle availability and the snoozed pickup time, the system may have the originally assigned vehicle temporarily pull over or change their route to the pickup location (where the original vehicle remains assigned to the trip), or, alternatively, reassign the trip to another vehicle for more efficient fleet management. In one scenario, the user may request a specific delay for the pickup, while in another scenario the system may present one or more micro-scheduling options. This can bound the updated pickup at some specific time (e.g., 30 minutes or 1 hour from the original time). Alternatively, different snooze "windows" may be presented to the user, e.g., at intervals of 5 or 10 minutes (or more or less). Moreover, the system may set a limit for how many times the pickup can be snoozed, such as 1, 2, 3 or more times.

Requesting callback support involves an API call that requests that rider support (e.g., via a remote assist workstation of the ride hailing system) should contact the customer. The request should contain the trip name, returned by an earlier create trip query. The request may also contain a phone number to call or other contact information (e.g., email address or social messaging handle). If no phone number or contact information is included, rider support can use the phone number included in or otherwise associated with the original propose trip plan request. The input includes the trip identifier, and may include contact information for the customer (e.g., their phone number). The result may be the customer being contacted by remote assistance. However, if this is not possible for some reason, the output may be an error message with a reason for the error. A phone number, website or other contact information may also be provided in the output so that the customer is able to obtain assistance.

Figure 5:
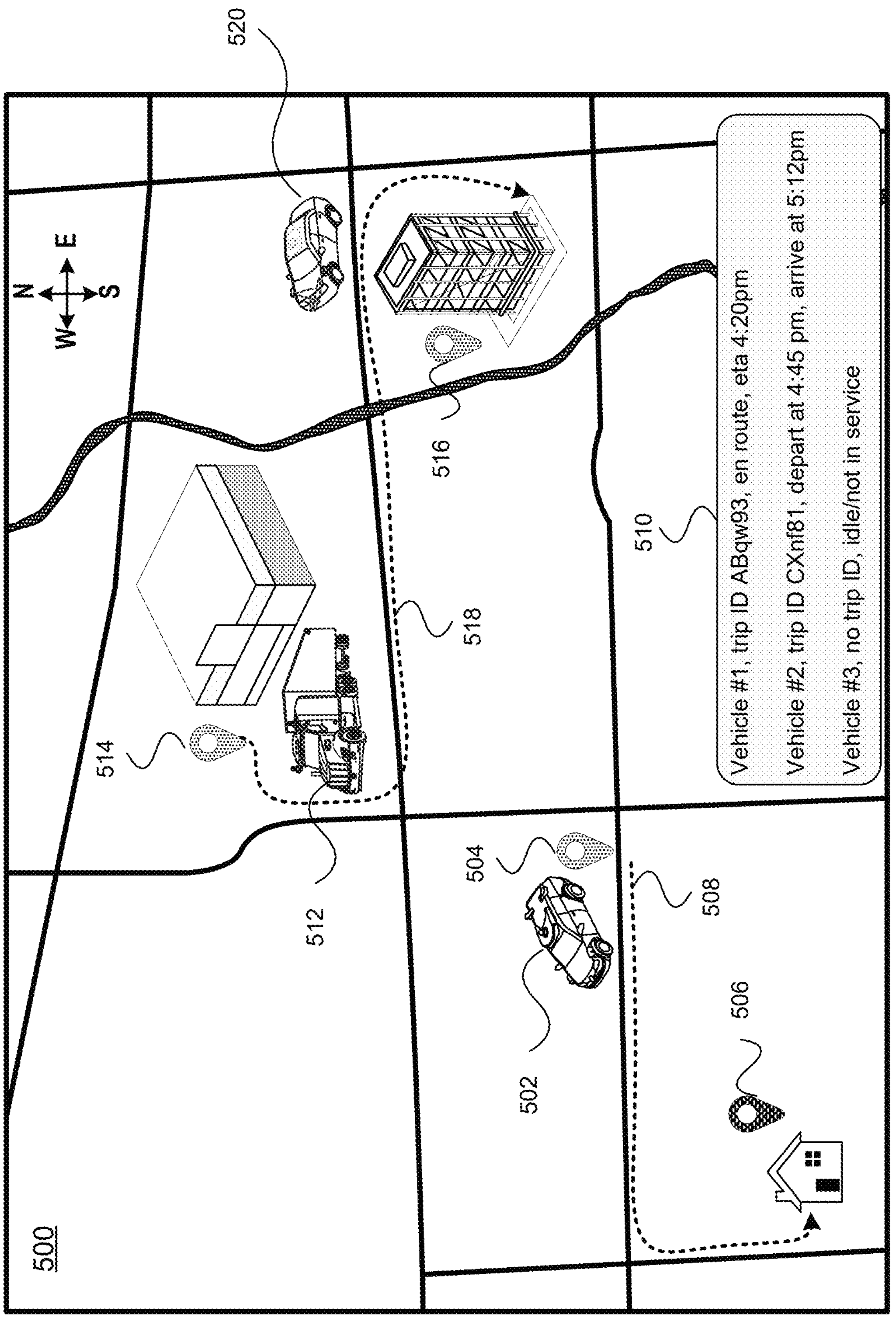
FIG. 5 illustrated a graphical interface for use with aspects of the technology

FIG. 5 illustrates a trip map 500 that may be displayed in a user interface of an app, for instance showing the current operational status of a fleet of autonomous vehicles. The map may indicate a current trip for a first vehicle 502 (e.g., "Vehicle #1"), which is en route from a current position 504 to a destination 506 such as a house. This information can be generated by the trip provider system and transmitted to the customer. As shown, the first vehicle 502 is traveling along a planned route 508, for instance to deliver groceries or a meal, or to pick up a passenger. As shown in the user interface box 510, information about this vehicle, including its trip ID, current status ("en route") and estimated time of arrival may be presented to the partner's agent. The map also indicates a scheduled trip for a second vehicle 512. Here, the second vehicle may be scheduled to depart from a warehouse 514 and travel to an office or store 516 via route 518. Here, the user interface box 510 also indicates the vehicle ("Vehicle #2"), its trip ID, current status ("depart at 4:45 pm") and estimated time of arrival ("arrive at 5:12 pm"). The agent may be able to view additional details of each trip, such as the type of vehicle, what is being delivered, where the vehicle will go after this trip, etc. And as noted above, the agent may be authorized to modify the planned trip, for instance to make it a recurring trip. This figure also shows a third vehicle 520, and the UI box 510 indicates that this vehicle ("Vehicle #3") is unaffiliated with a trip ("no trip ID") with a status of "idle/not in service".

Figure 6:
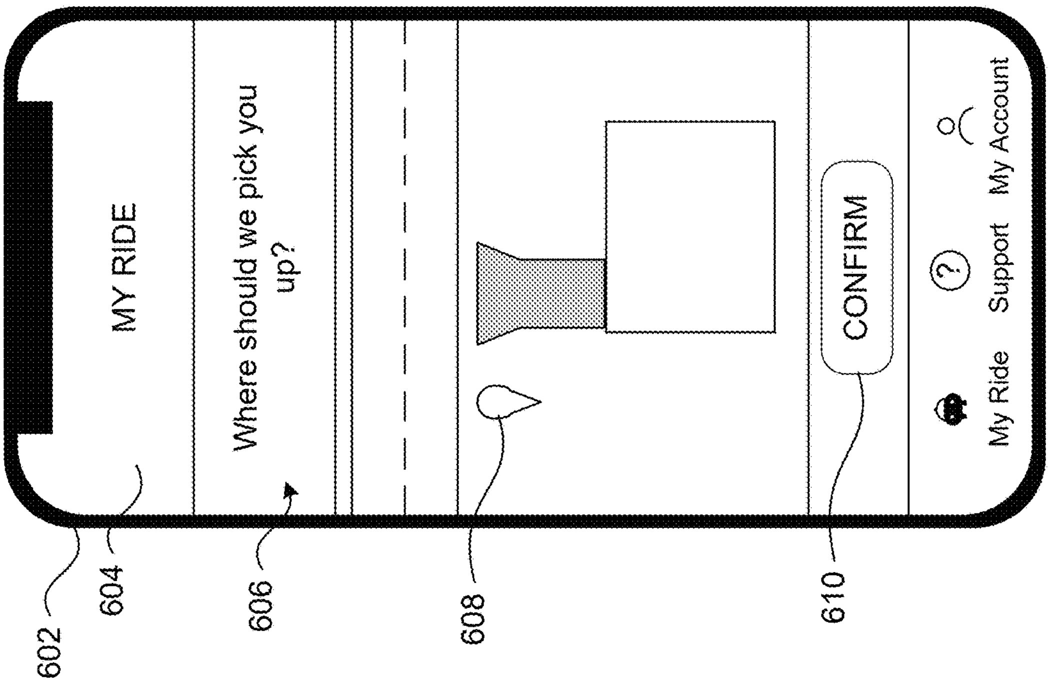
FIG. 6 illustrates a client device user interface in accordance with aspects of the technology.

Ride hailing (trip scheduling) may be arranged when a user schedules a pickup or drop-off by an autonomous vehicle. This can be done using a ride hailing app on the user's mobile phone or other client device (e.g., tablet PC, smartwatch, etc.). As shown in view 600 of FIG. 6, client device 602 has an app with a user interface 604, which can be used to schedule the trip with an autonomous vehicle ride hailing service. The customer scheduling the trip may select a pickup spot. For instance, one part of the user interface 606 may ask where the rider would like to be picked up. The user may manipulate the user interface to select a spot, such as shown by icon 608 in a map display area of the user interface, and the user may confirm the spot via a button 610 or other selection option.

In order to perform pickup or drop-offs requested by a customer, which may include package or food deliveries, the vehicle or a fleet management system may evaluate a number of different sources of information. User information, for instance input via the app on their device, may include selection of a location of interest (e.g., a street address or coordinates associated with pushpin or other indicia placed on an electronic map) and/or the user's current location (e.g., based on GPS, WiFi or other localization data). Map information used for driving purposes by the vehicle, such as roadgraph data, can be used to plot a trip by the vehicle to the location of interest.

The ride hailing app may include a graphical interface that enables the customer to choose their destination. In one scenario, the interface may enable the customer to indicate whether they have any flexibility about the timing or location for pickup and/or drop-off. By way of example, the system may receive, via the API, a request for estimating the time to pickup at a specified location. The system may evaluate user preferences (e.g., a vehicle equipped with car seats, cargo space for luggage or packages, cost criteria, etc.) and fleet status, and then send options to the customer via the propose trip plan API. Then, depending on what the customer decides, a trip may be scheduled using the create a trip API.

The system may customize hail (ride) preferences for individual riders. This may be accomplished, by way of example, using two complementary approaches. The first approach provides users the ability to indicate their preferences between ETA, route length, price, and/or walking distance to allow the system to optimize the proposal provided via the app interface. Here, fleet management may provide an important technical advantage, as the system can use its knowledge of current and planned fleet usage to select how information is presented to the user.

The customer has the ability to save preferences globally (across all future trips). The customer may also update preferences for individual trips on an ad hoc basis. This may include modifying their default preferences when setting up the trip, or adjusting preferences during the trip (e.g., to change which side door to use when exiting the vehicle). In one scenario, preferences are maintained by the back-end system. In another scenario, one or more preferences may be stored locally on the user's client device, either alternatively or in addition to the back-end storage of preferences generally.

The system may evaluate different aspects for promoting and making visible the user's trip preferences in the user interface. The system may do this by compiling different sources of data and presenting the information clearly to the user. Thus, the interface may select information to present that involves various tradeoffs to the user, to enable them to make a ride hailing (trip scheduling) decision based on information most relevant to that person. These include, but are not limited to the following:

- Customer-specified settings/preferences,
- Infer a drop-off preference based on past trips, such as going to a frequent restaurant (or other point of interest),
- Route choices (e.g., route length, use of toll roads, carbon footprint impact, use or avoid freeways, etc.)
- Pickup and drop-off choices
- Residential versus commercial or industrial locations
- Walking distance (e.g., prefer minimum walking distance, willing to take a scenic path even if not the shortest distance, etc.

Figure 7:
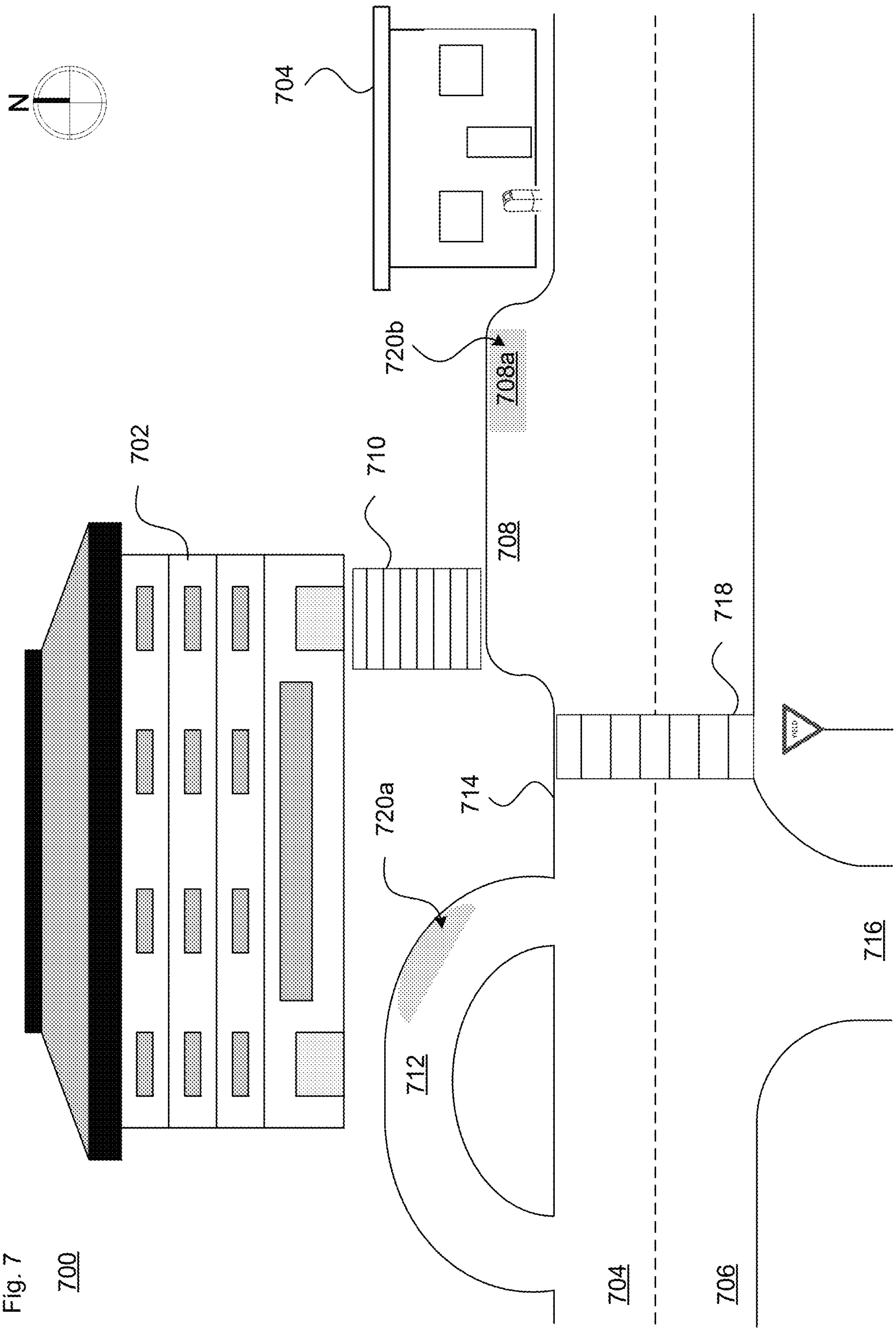
FIG. 7 illustrates an example scenario in accordance with aspects of the technology.

Curb cutouts,
Avoid street crossings,
Avoid stairs or steps,
Avoid hills or uneven terrain,
Use well-lit areas,
Use areas with more foot traffic, FIG. 7 illustrates an example ride hailing scenario 700, in which the general pickup area includes a building 702, such as an apartment or office building, and a nearby store 704 such as a convenience store. In this example, both the building 702 and the store 704 are on the same side of a road having a westbound segment 704 and an eastbound segment 706. As shown, there may be a curb cutout 708 with a specialty parking spot 708*a* (e.g., a short-term parking spot), which is adjacent to the store 704 but also leads to the building 702 via stairs 710. There is also a parking turnout 712 from the westbound segment 704, with a curb section 714 between the curb cutout 708 and the parking turnout 712. There is a northbound street 716 that intersects with the east/west roadway, and there is a crosswalk 718 adjacent to the intersection that leads towards the curb section 714.

In this scenario, the customer may initially request to be driven to the building 702. While in many instances, the customer may use the building's street address as the drop-off destination, they may also use an icon or other indicia on a map displayed on the user interface to select the destination. The system may have different options for where the autonomous vehicle could pull over, including the cutout (either adjacent to the stairs 710 or in the specialty parking spot 708*a*), along curb section 714, in the turnout 712, or on the eastbound side of the road, such as just past the crosswalk 718. The system may factor in the user's preferences regarding curb cutouts, avoiding stairs and/or avoiding street crossings. In some instances, certain preferences such as negative preferences (e.g., avoid stairs or avoid crossing a street) may be weighed more heavily or otherwise given a higher priority than positive preferences (e.g., part as close as possible to a store). In other instances, positive preferences may be weight more heavily or otherwise given a higher priority than negative preferences. The weighting or other prioritization may be done on a preference by preference basis. Thus, the system may select certain options for presentation to the customer via the user interface, such as spot 720*a* along the turnout 712, or spot 720*b* along the cutout 708 (here, at the specialty parking spot 708*a*). Thus, this is one way the system may promote customer trip preferences via the user interface.

Figure 8:
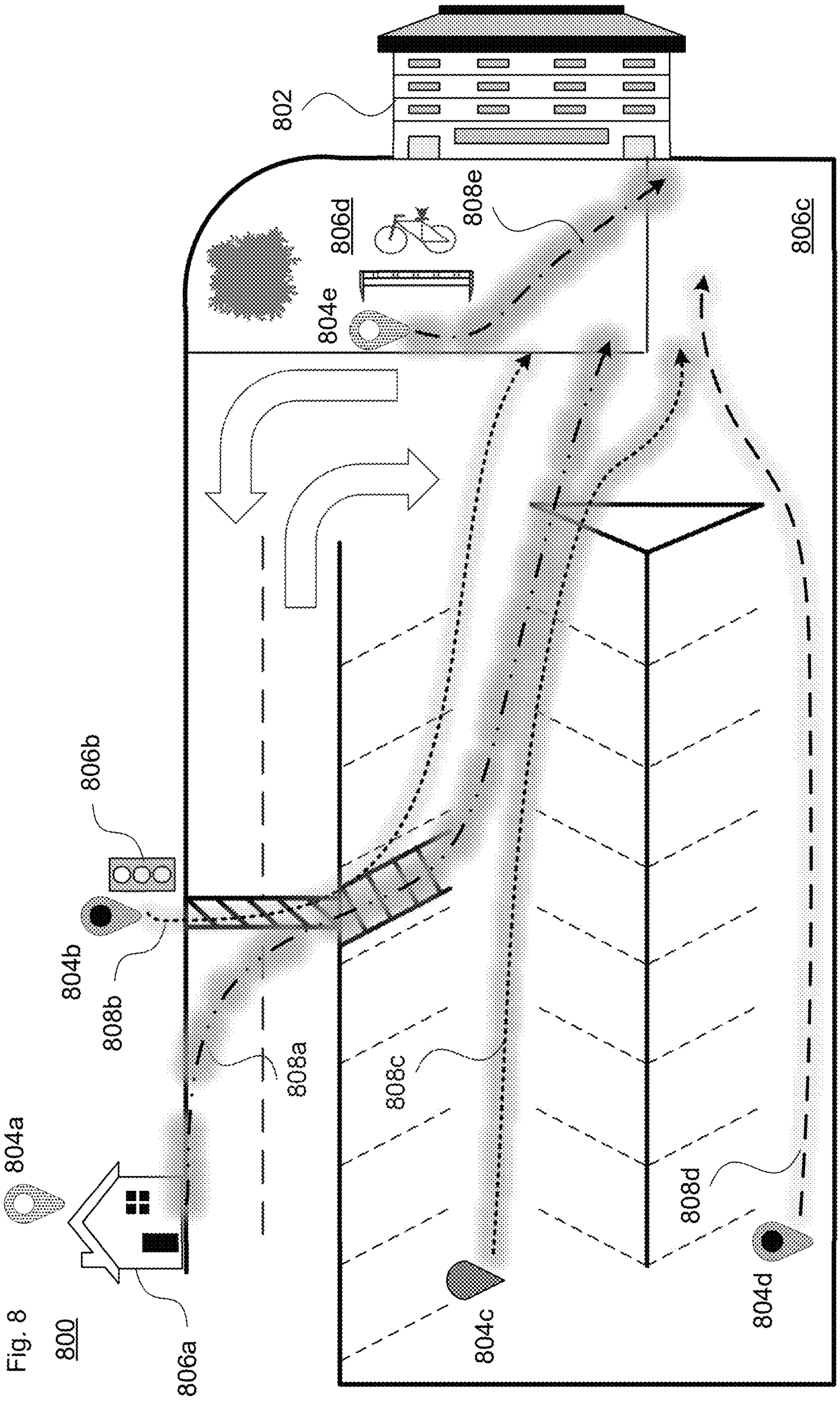
FIG. 8 illustrates another example scenario in accordance with aspects of the technology.

FIG. 8 illustrates an example drop-off scenario 800, in which the destination 802 has already been determined. In this example, the destination may be, e.g., a store, mall, office building, hotel, train or bus station, etc. The system may evaluate user preferences, such as their general trip preferences or specific preferences for this individual trip, along with real-time and/or historical traffic information, weather conditions, information about the vehicle providing the trip and/or other factors such as external variables that can impact whether riders are scheduling trips. By way of example, external variable could include a mass transit strike or service failure, or a change in status for another ride providing service.

Based on this, the system may identify a set of drop-off positions 804. For instance, position 804*a* may be in front of house 806*a* in a residential neighborhood near to the destination 802. Position 804*b* may be by traffic light 806*b*, which is by a crosswalk. Positions 804*c* and 804*d* may be in a parking lot 806*c*, while position 804*e* may be at a bicycle rack 806*d* in front of the destination 802. The system may estimate a set of walking paths 808, with one path (or even multiple paths) leading from each position 804 to the destination 802.

The system may rank each position and/or each walking path based on the user's preferences and/or other factors. By way of example, position 804*e* may be given a high ranking (e.g., a top 3 option) because it has the closest walking path 808*e*. In contrast, positions 804*c* and/or 804*d* may be ranked lowest out of the set of positions because they have among the farthest walking paths 808*c* and 808*d*, respectively, and/or because they are in an active parking lot. In contrast, positions 804*a* and/or 804*b* may be ranked among the highest options because they match a user preference (e.g., residential neighborhood, use well-lit areas, etc.). Based on the rankings, the system may curate the options and send information to the user's mobile device, which can occur before or during the trip. The user's selection is communicated to the vehicle, and the vehicle is able to proceed to the selected position. This selection may be communicated to the vehicle via a back-end fleet management system that is in communication with the user's device (e.g., via a wireless network), or directly between the user's device and the vehicle's onboard communication system (e.g., via an ad-hoc wireless link).

Ranking can also consider factors other than just "walking cost". For instance, ranking can include any of prior information about "good" parking spots (e.g., parking spots that are within a threshold distance of a store or even a particular entrance/exit of the store), routing costs, traffic, etc. In one scenario, the system sets the default preferences, and for each trip the rider can be presented with options and the metadata to choose a different pickup or drop-off spot to their liking, which may not correspond to their preferences.

The second approach intelligently serves riders various proposals and algorithmically learns about rider preferences to inform their optimal preference between ETA, route length, price, walking distance and/or other factors discussed herein to allow us to optimize the proposal provided. By way of example, when the user sets their preferences, the system can identify what similarities exist between the trip details and the preferences set, and then learn a way to generalize this to pickups and/or drop-offs for locations that have not been served to this customer before. Note that the first approach focusing on user preferences may be used to seed the latter approach.

One or more machine learning models may be employed, which may include neural networks such as deep neural networks (DNNs), e.g., a convolutional neural network (CNN). The model(s) may be trained by using preference data from the specific customer and/or other customers. It may also be trained on other information, such as actual routes taken and specific pickup or drop-off locations used by a fleet of autonomous vehicles in the past (collectively: fleet trip information), environmental information (e.g., weather, season and/or time of day), sensor information such as imagery that can indicate whether a particular location or path is well-lit or whether pedestrians have used such locations or paths in the past (collectively: sensor information), etc.

Additional sources of information can help augment these approaches for training the model. For instance, the system may evaluate crowd-sourced information as another training input. This may include explicit feedback from prior completed trips and/or aggregated drop-off preference(s) for a particular location (or multiple locations).

Figure 9:
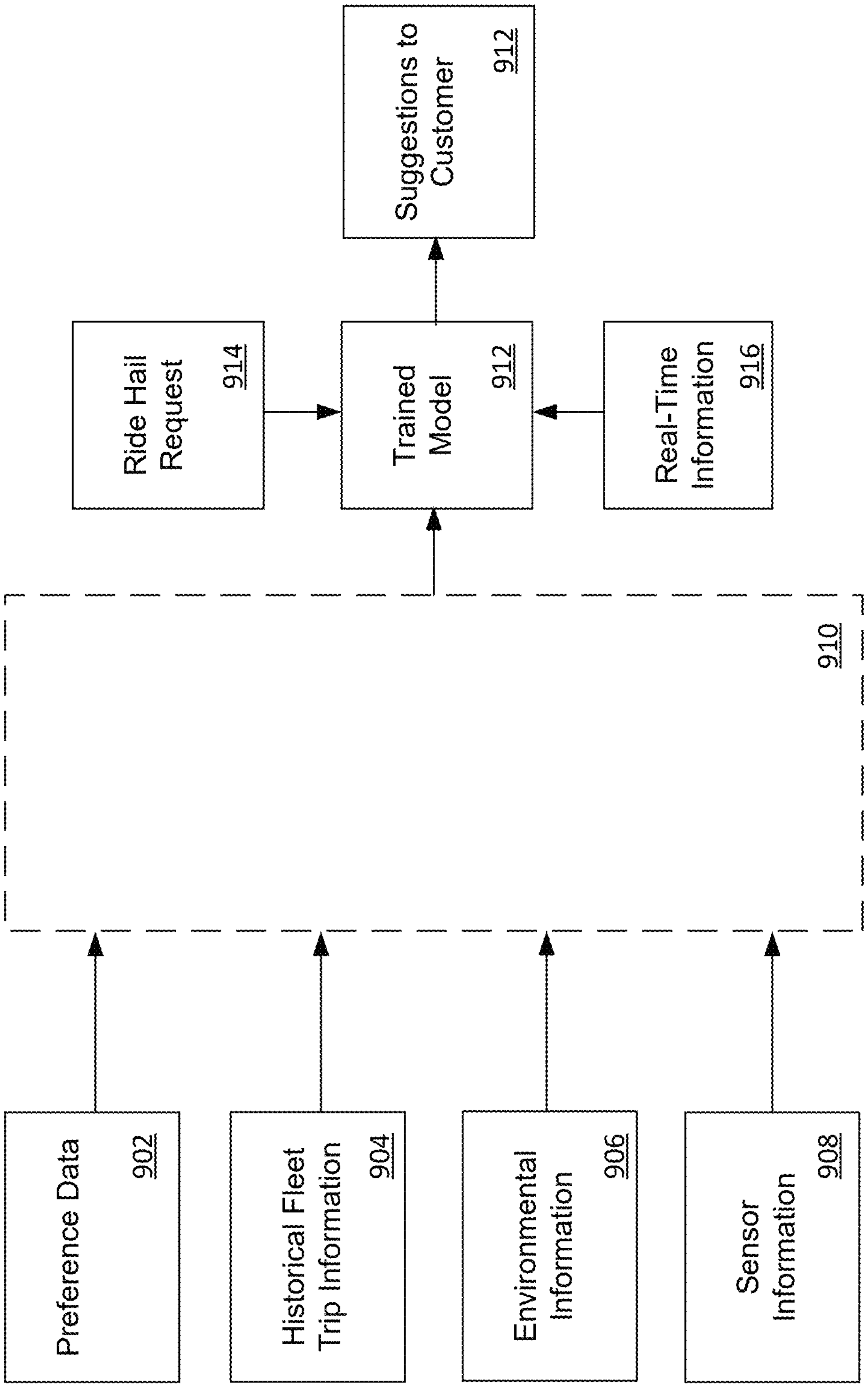
FIG. 9 illustrates a training approach in accordance with aspects of the technology

FIG. 9 illustrates an example 900 for training a model. Different sets of training data, including customer preference data 902 (which may be user preferences of a specific customer or preferences from a set of customers) along with one or more of historical fleet trip information 904, environmental information 906 and sensor information 908 are fed into a neural network shown in block 910. The deep neural network or other machine learning approach, once trained on the inputs, generates a trained model 912.

Once the model is trained, when a ride hail request 914 is received, information about that request is input to the trained model 912 along with real-time information 916. The real-time information may include one or more of traffic information, fleet availability (current or prospective) or other fleet constraint information, current weather conditions, etc. Then one or more ride hail suggestions 918 are generated, which can be ranked or otherwise curated (which can include discarding or prioritizing certain ones of the suggestions according to criteria associated with the current ride hail request), and then the curated suggestions are served to the customer.

The curated suggestions may include one or more pickup or drop-off positions, walking paths from the positions to the vehicle or to the destination, or both. If any of the suggestions match up with the customer's preferences or trip request information, that may be identified in the details presented to the person via the user interface on their device. Alternatively or additionally, the presented information may explain why one or more of the suggestions are being presented, such as "We found a walking path that is slightly longer, but well-lit". The suggestions may include deferring the trip to sometime in the future, which may be later the same day, or some other day for a recurring event such as a trip to the grocery store or dry cleaners. For instance, the system may inform the customer that "You may want to pick up groceries tomorrow afternoon instead of today, because the trip to the store should have less traffic and better weather tomorrow". Thus, the information presented may factor in various tradeoffs and enable the customer to make a ride scheduling decision based on information most relevant to that person.

Alternatively or additionally to the above, the system may recommend to the customer that they check back in at a later time before scheduling their trip. This may be because the system has identified a current fleet utilization or other availability constraint that may not support booking a trip at the current time. Thus, in one example, if the customer is looking to schedule a trip to the airport later in the day or week during a rush hour period, the system may not currently be able to determine how many vehicles or which vehicles (if any) could service the trip. In one example, if the trip would occur at a future time outside of a current scheduling window, the system can suggest a later time for the customer to request their ride, which would encompass the necessary scheduling window having the availability of vehicles that could service the trip. Here, the system may indicate a specific time (e.g., 2:45 pm) or a time window (e.g., between 2:30 pm and 3 pm) when the customer should try to book their trip.

In an alternative, the system may allow the customer to schedule a trip in the future (e.g., later in the week or in a few weeks), and correspondingly adjust fleet capacity based on the planned demand. Thus, if the customer wants to book a trip to and/or from the airport over a long holiday weekend a few weeks or months in advance (e.g., travel to the airport on a Friday, return from the airport on a Monday), the system can allow this long-range trip to be scheduled by the customer. By way of example, the trip planning system may either reserve specific vehicles for each of these trips, or may adjust fleet capacity to ensure there is sufficient coverage to support these trips in addition to any projected trips that may be scheduled closer to the date(s) in question (e.g., same-day trips). This can include an evaluation of historical demand for those dates, a similar time period, or a similar trip condition (e.g., a holiday weekend).

Even after the suggestions have been presented to the customer and they have made their choice(s), real-time information may be employed by the vehicle or the back-end fleet management system to update the customer and give them additional flexibility with regard to the trip. For instance, the system may utilize vehicle camera data (or other sensors) from the autonomous vehicle providing the trip to give updated contextual information for a given pickup or drop-off stop. This can include identifying whether people are effectively getting into and out of nearby vehicles from one side of the street or the other as they head towards a selected location. The system may also use sensor information previously collected around the selected location to determine whether it was easy to find the vehicle and get in, how long the vehicle was able to wait before congestion was a problem (including considering tradeoffs on how long to wait), etc. This additional information could trigger updated recommendations or other notifications to the user about which side to enter the vehicle, or how long the vehicle will likely be able to wait at the location.

The trip planning system may support the scheduling of future rides, such as later in the day or week, in which the trip would occur at a time outside of a current system scheduling window. In this case, the system may not currently know which specific vehicles or even estimate how much of the fleet would available to provide rides for such future trips. Thus, according to one aspect of the technology, a calendar slot trip scheduling approach may be employed.

By way of example, this approach may operate as follows. A rider can book a future trip in a particular calendar slot, with the trip plan being saved "offboard" by the system. Here, because the future trip is outside of a current system scheduling window, offboard indicates that the information regarding the future trip plan is maintained in a database or other record, which can be retrieved and used to set up the trip when the calendar slot satisfies a threshold time criterion with regard to the current scheduling window. For instance, because a current scheduling window may not support the trip, e.g., because the current window only covers the next 4 hours but the calendar slot is 6 hours from now, offboard saving of the trip plan can be used to set up the trip by the trip planning system when the relevant timeframe is available. Thus, the trip planning system may be periodically probed using the saved trip plan. This could occur, e.g., once a minute, every 15 minutes, hourly, or at some other periodic interval. Or, alternatively, the system may query a database that has the saved query when there is a match between the current time window and the calendar slot.

One way this can function is as follows. First, the trip is planned by user, e.g., including identifying a pickup location, a drop-off destination, and either a pickup time or a drop-off time. This causes the system to generate a trip plan. On offboard side, the trip plan is saved in back-end storage in the database or other record. The system can then automatically retrieve the request. This can be performed according to a timestamp corresponding to the request (e.g., tied to the pickup or drop-off time). Upon retrieval, the system can attempt feed the user's request into the scheduling queue so it can be treated as a real-time request—in other words, treated equivalently to a real-time trip that would be set for a time within the current time window serviced by the scheduling system. If vehicle can serve it, then dispatch. If it cannot be serviced at that point, then the system may retry again, e.g., in 30 or 60 seconds, or longer. This may be repeated until the trip request is serviced, or until the time for servicing the request has passed.

The slotting approach for future trips outside of the current scheduling window may have a limited availability for each slot. For instance, a maximum of up to N requesters may be permitted for each slot. This can avoid the situation where too many people try to reserve a vehicle at a normally busy time, e.g., during rush hour on a Friday evening. Here, N may vary from slot to slot. This may be done according to an expected vehicle capacity for the timeframe that encompasses one or more timeslots.

In one scenario, the calendar slot approach may function as follows. A rider may use an app or a website to book a calendar slot in advance. This may include identifying the date and/or other information about the trip. This can trigger a request to the system to identify which slots are available. The system then provides a list of slots, which may be all available slots or just a subset of slots closest in time to the user's query (e.g., within 30 minutes of the desired pickup time). As part of this, the system may calculate how many vehicles will be in supply at that time (e.g., based on vehicle inventory and historical demand). The calculation should identify a number of vehicles that can serve trips with high confidence (e.g., at least 95-98% confidence or higher), without undue delay. This vehicle calculation can be fine-tuned per service area and/or based on other factors such as expected demand at the pickup or drop-off location(s) around that future time.

Figure 12A:
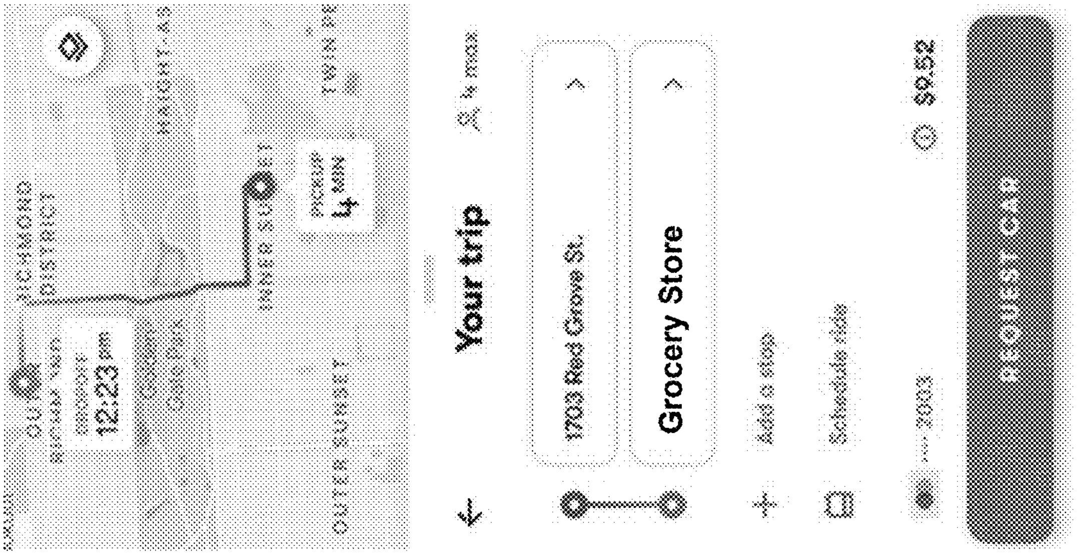
FIGS. 12A-E illustrate an example user interface for scheduling a future trip in accordance with aspects of the technology.
Figure 12B:
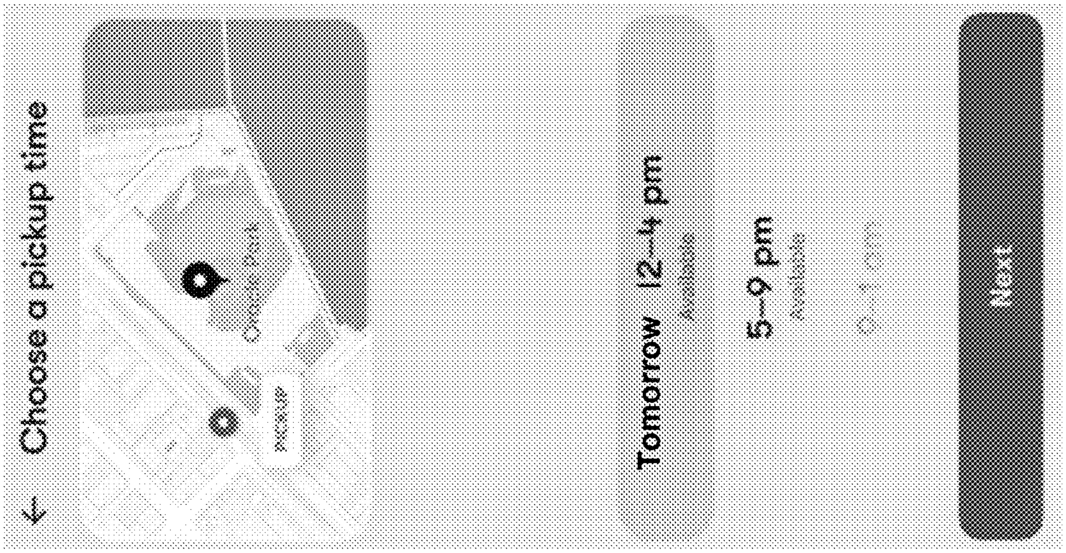
Figure 12C:
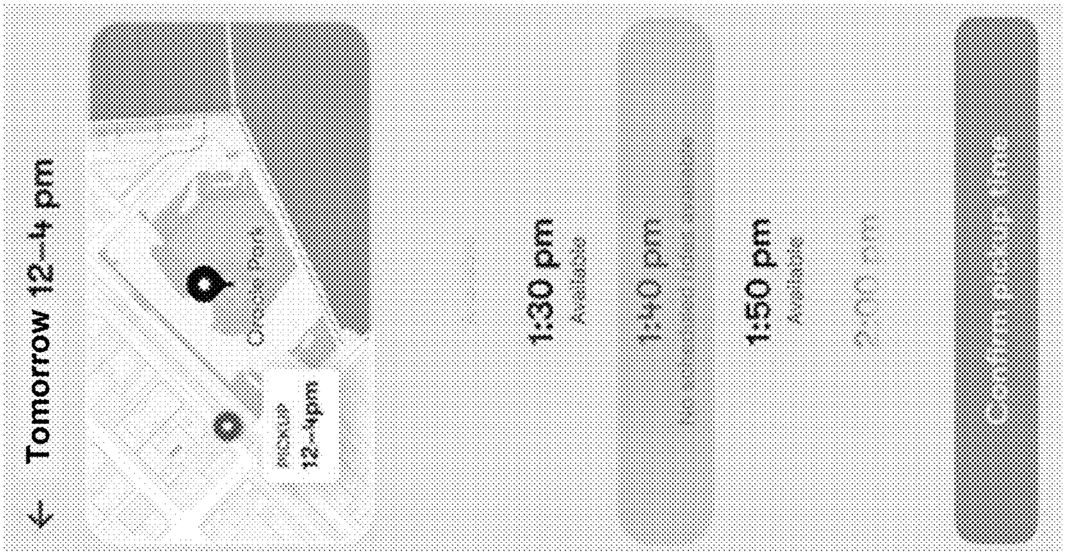
Figure 12D:
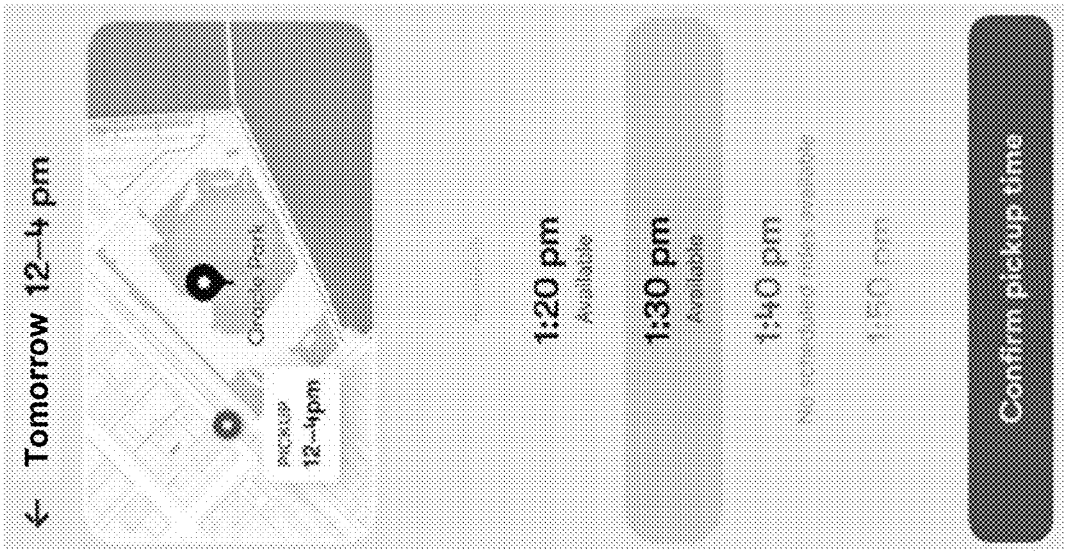
Figure 12E:
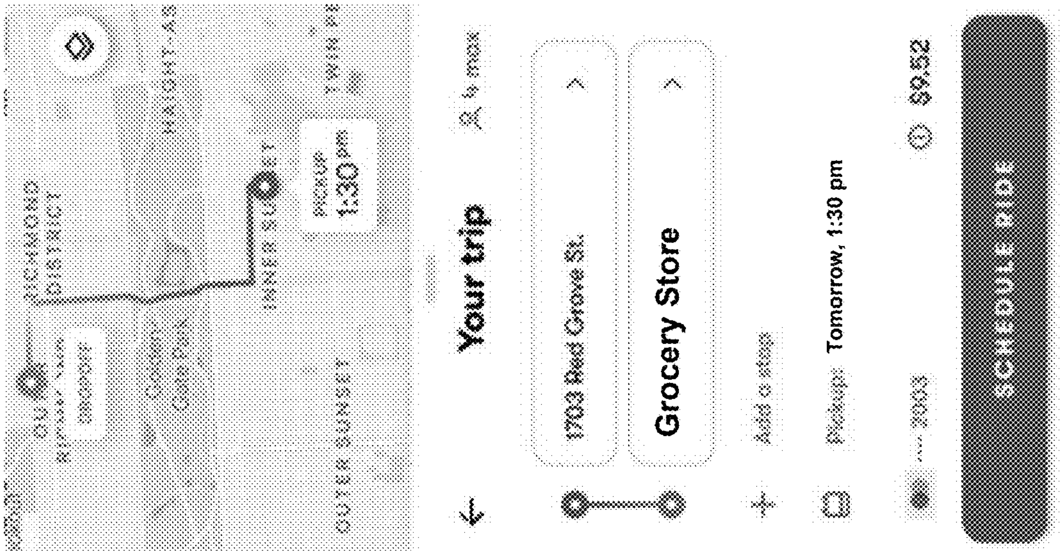

An example client device UI illustrating the scheduling is presented in FIGS. 12A-E. As shown in FIG. 12A, the UI provide the user the ability to initiate a trip plan by, e.g., identifying a pickup location (here, 1703 Red Grove St.) and a destination (e.g., grocery store). Then, as shown in FIG. 12B, the UI enables the user to choose a pickup time, here with two general timeframes tomorrow, either between 12-4 pm or 5-9 pm. FIG. 12C illustrates an example of the UI where a set of slots for selectable times is presented. Thus, in this scenario, if the user selected the earlier general timeframe (here, 12-4 pm), the UI is showing that the 1:30 pm and 1:50 pm slits that day are available, but the 1:40 pm slot is greyed out, indicating it is not available. As shown in FIG. 12D, the 1:30 pm slot has been selected for tomorrow. Then the UI, as illustrated in FIG. 12E, presents the trip summary to the user, with the pickup time (1:30 pm), pickup spot, and drop-off location. Once the trip has been scheduled by the rider, but before or when the system attempts to assign a vehicle to service the trip, the system may notify the rider if any changes may need to be made, for instance the ETA may have changed due to traffic or construction. As noted herein, this may include offering different pickup and/or drop-off locations or adjusting the ETA.

A trip plan corresponding to the selected calendar slot (e.g., pickup at 123 Maple Street at 3 pm next Friday, with a drop-off at terminal B of the airport at approximately 3:45 pm) can be saved offboard or otherwise maintained by the trip provider system. The trip provider system may start the search for a vehicle to provide the trip when the scheduled pickup time is within a real-time pickup duration limit. By way of example, if the real-time pickup duration limit is 1 hour (or more or less), then the system may start the search 1 hour prior to 3 pm (i.e., 2 pm) on the Friday of the planned trip.

In one scenario, the system may start checking the trip plan feasibility in advance (~30-60 minutes before the expected pickup time) and notify users about reachability changes if current conditions (e.g., traffic, construction, weather, etc.) are impacting the pick-up time. In this case, if the conditions would prevent the pickup at the selected location (e.g., there has been an emergency road closure, such as due to a water main break that has flooded the roadway), the system may offer one or more alternative pickup (and/or drop-off) locations. If it is not feasible to achieve a pickup (or drop-off) at the selected time, then the system may offer one or more alternative times in accordance with fleet availability. In another situation, while the system may dispatch a vehicle for the trip based on ETA, the actual arrival at the pickup spot can vary in real-time, e.g., due to traffic conditions.

In the case where the vehicle arrives on location earlier than expected, the system may control the vehicle's behavior, e.g., by driving around the block or parking at a nearby location that is not the pickup location. Then the vehicle could arrive at the pickup location at the selected time. Alternatively, the system (or the vehicle) could notify the rider of its early arrival. In this case, the notification could indicate that the vehicle will wait for a planned grace period according to the selected pickup time (e.g., on the order of 5 minutes, or more or less), rather than based on the actual arrival time.

The system may periodically probe the proposing trip plan API with the saved (e.g., offboard) trip plan. If an optimal assignment (which may be based on pickup ETA and/or other factors) vehicle's ETA plus the current time is within a certain time threshold (e.g., between X−5 minutes and X+5 minutes), then the offboard system would create the trip for the rider, cause the vehicle to be dispatched, and send a notification to the rider about the trip. Otherwise, the system may notify the user with proposed changes such as discussed above.

To ensure vehicle capacity for such pre-scheduled trips, the system may leverage one or more demand control features. This can include dynamic pricing for riders who are scheduling trips in real time and/or riders who are scheduling future trips via the calendar slot approach. Alternatively or additionally, it may include "hail throttling", where scheduling for real-time trips is limited to ensure that any future trips are able to be handled by the fleet of vehicles. Furthermore, if the number of future trips scheduled via the calendar slot approach exceeds some threshold (e.g., 10-25% of planned fleet capacity, or more or less), then the system may attempt to add more vehicles during that timeframe. Thus, if the fleet has a planned capacity of 100 vehicles for the Friday of a holiday weekend, and if the number of future trips in the calendar slots for that Friday afternoon is 30, then the system may provision for 130 vehicles to be in-service for that afternoon. Moreover, the reservations via the calendar slot approach can be used by the system to refine how many vehicles can be provisioned for service by the fleet.

The number of slots allotted for each time in the calendar may be limited to ensure that enough vehicles are available at that time to service demand for both future trips and real-time trips (trips that can be immediately scheduled in the current system scheduling window, such as in the next 45 minutes or within the next 4 hours). Moreover, the vehicle capacity may include a "reserve" amount of vehicles. The reserve amount may include vehicles that are scheduled for routine maintenance or cleaning, but that could be dispatched if needed to service a trip. Alternatively or additionally, the reserve amount of vehicles could include vehicles prepositioned at selected locations that can serve specific areas (e.g., high demand locations such as an airport, train station, mall or arena as needed). This reserve amount could be adjusted to compensate for future trips. Alternatively or additionally, the fleet capacity for future trips may be impacted by cancellations. Thus, if a trip is cancelled before the current time window opens (and thus before the trip is actually scheduled via the trip plan API), there may be excess capacity for on-demand real-time trips. Or if the trip is cancelled once it has been scheduled and/or after a vehicle has been dispatched, the system may be able to redirect that vehicle for an on-demand trip.

The system may control the demand for future trip scheduling in different ways. This can include charging a higher price for busy period, or giving a discount because the trip is being scheduled in advance. A passholder or premium membership may reduce or waive any surcharge for high-demand times. In one scenario, the calendar slots may be arranged so that the first X rides within a given slot are assigned a first pricing rate, while the subsequent Y rides within the given slot are assigned a second pricing rate (e.g., a higher rate).

Example System Architecture

Figure 10A:
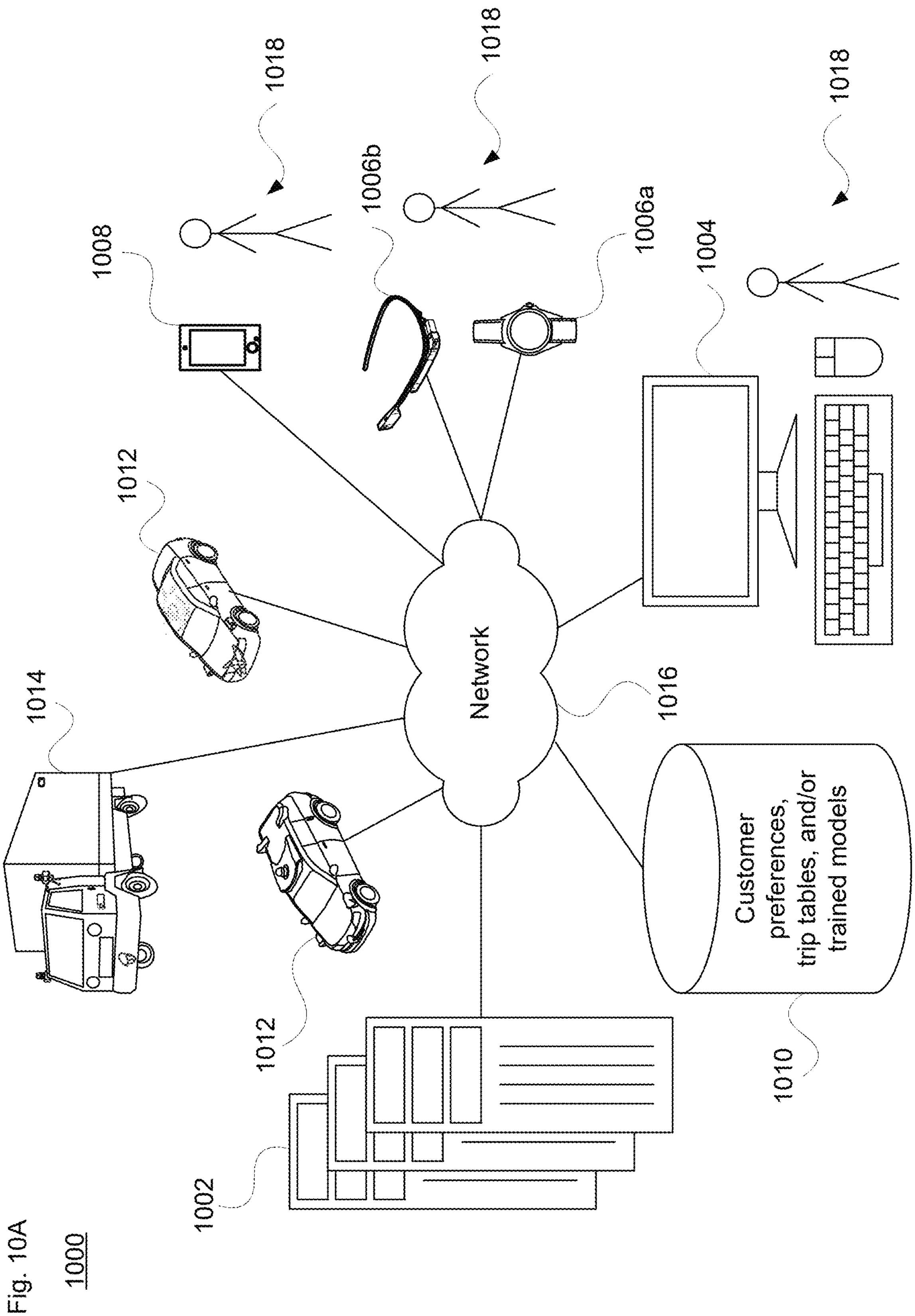

One example of a back-end ride-hailing system for customers of a fleet of autonomous vehicles is shown in FIGS. 10A and 10B. In particular, FIGS. 10A and 10B are pictorial and functional diagrams, respectively, of an example system 1000 that includes a plurality of computing devices 1002, 1004, 1006, 1008 and a storage system 1010 connected via a network 1016. System 1000 also includes vehicles 1012 and 1014 configured to operate in an autonomous driving mode, which may be configured the same as or similarly to vehicles 100, 120, 140 and/or 160 of FIGS. 1A-E. Vehicles 1012 and/or vehicles 1014 may be parts of one or more fleets of vehicles that provide rides for passengers or deliver meals, groceries, cargo or other packages to customers. Although only a few vehicles and computing devices are depicted for simplicity, a typical system may include significantly more, such as tens or hundreds of vehicles. As shown in FIG. 10B, each of computing devices 1002, 1004, 1006 and 1008 may include one or more processors, memory, data and instructions. Such processors, memories, data and instructions may be configured similarly to the ones described above with regard to FIG. 2 or 3A.

The various computing devices and vehicles may communicate directly or indirectly via one or more networks, such as network 1016. The network 1016 and any intervening nodes may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 1002 may include one or more server computing devices having a plurality of computing devices, e.g., a load balanced server farm, that exchange information with different nodes of a network for the purpose of receiving, processing and transmitting the data to and from other computing devices. For instance, computing device 1002 may include one or more server computing devices that are capable of communicating with the computing devices of vehicles 1012 and/or 1014, as well as computing devices 1004, 1006 and 1008 via the network 1016. For example, vehicles 1012 and/or 1014 may be a part of a fleet of autonomous vehicles that can be dispatched by a server computing device to various locations. In this regard, the computing device 1002 may function as a dispatching server computing system which can be used to dispatch vehicles to different locations in order to pick up and drop off passengers or to pick up and deliver cargo or other items. In addition, server computing device 1002 may use network 1016 to transmit and present information to a user of one of the other computing devices or a rider in a vehicle. In this regard, computing devices 1004, 1006 and 1008 may be considered user computing devices.

As shown in FIGS. 10A-B each client computing device 1004, 1006 and 1008 may be a personal computing device intended for use by a respective user 1018, and have all of the components normally used in connection with a personal computing device including a one or more processors (e.g., a central processing unit (CPU), graphics processing unit (GPU) and/or tensor processing unit (TPU)), memory (e.g., RAM and internal hard drives) storing data and instructions, a display (e.g., a monitor having a screen, a touch-screen, a projector, a television, or other device such as a smart watch or head mounted display that is operable to display information), and user input devices (e.g., a mouse, keyboard, touchscreen, microphone or gesture sensor such as a close range RF gesture detection device). The client computing devices may also include a camera for taking images or recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 1006 and 1008 may be mobile phones or devices such as a wireless-enabled PDA, a tablet PC, a wearable computing device (e.g., a smartwatch or head mounted display), or a netbook that is capable of obtaining information via the Internet or other networks.

In some examples, client computing device 1004 may be a remote assistance workstation used by an administrator or operator to communicate with riders of dispatched vehicles, customers awaiting deliveries or store employees providing items for delivery. Although only a single remote assistance workstation 1004 is shown in FIGS. 10A-B, any number of such workstations may be included in a given system. Moreover, although the workstation is depicted as a desktop-type computer, such workstations may include various types of personal computing devices such as laptops, netbooks, tablet computers, etc. By way of example, the remote assistance workstation may be used by a technician or other user to help adjust pickup or drop-off locations, assist riders with opening or closing the vehicle's doors, etc.

Storage system 1010 can be of any type of computerized storage capable of storing information accessible by the server computing devices 1002, such as a hard-drive, memory card, ROM, RAM, DVD, CD-ROM, flash drive and/or tape drive. In addition, storage system 1010 may include a distributed storage system where data is stored on a plurality of different storage devices which may be physically located at the same or different geographic locations. Storage system 1010 may be connected to the computing devices via the network 1016 as shown in FIGS. 10A-B, and/or may be directly connected to or incorporated into any of the computing devices.

Storage system 1010 may store various types of information. For instance, the storage system 1010 may store autonomous vehicle control software which is to be used by vehicles, such as vehicles 1012 or 1014, to operate such vehicles in an autonomous driving mode. Storage system 1010 may also store roadgraph information, route information, weather information, etc. This information may be shared with the vehicles 1012 and 1014, for instance to help with operating the vehicles in an autonomous driving mode. Such information can also be shared with customers via the UI or other app on their client device(s). The storage system 1010 can also include customer preferences, trip tables and/or trained models as discussed herein.

FIG. 11 illustrates a flow diagram 1100 according to one aspect of the technology, which provides a method that includes, at block 1102, receiving, by one or more processors of a ride hailing system, a ride hail request from a client device of a user. The ride hail request includes information about at least one of a pickup to be scheduled or a drop-off to be scheduled. At block 1104 the method includes obtaining, by the one or more processors, real-time information including fleet constraint information associated with a fleet of vehicles. Then at block 1106 the method applies the received ride hail request information and the obtained real-time information to a ride hailing model that is stored in memory of the ride hailing system. The ride hailing model has been trained on training data including customer preference data and historical fleet trip information associated with the fleet of vehicles. From the mode, at block 1108 the one or more processors obtain a set of ride hail suggestions that includes at least one of (i) one or more pickup positions, (ii) one or more drop-off positions, (iii) one or more walking paths from a given pickup position to a vehicle, or (iv) one or more walking paths from a given drop-off position to a destination. And at block 1110 the method includes sending the set of ride hail suggestions to the client device for presentation to the user.

While certain use cases described above focus on rider pickup situations in the ride hailing context, the technology may be used in many other situations. This can include delivery situations, where the person going to the vehicle may be a restaurant or store employee loading the vehicle with a meal, groceries, prescriptions or other packages. Similarly, in a trucking scenario, the person or people heading to the vehicle could be warehouse workers that will load or unload the truck with cargo, or that need to transfer cargo to or from the truck (e.g., a mail delivery truck). All of these situations can benefit from the approaches described above.

The features described herein may enable a fleet management system to provide useful, targeted information that can assist riders with trip planning. By better understanding rider preferences while also having real-time knowledge of fleet operations, the system can give riders the information they want (or need) to perform ride hailing for future rides. It can help fleet efficiency, rider retention, and brand loyalty as well.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A computer-implemented method, comprising:

receiving, by one or more processors of a ride hailing system, a ride hail request from a client device of a user, the ride hail request including information about at least one of a pickup to be scheduled or a drop-off to be scheduled;

determining, by the one or more processors, that the ride hail request is for a future time outside of a current scheduling window for trip planning by the ride hailing system;

upon determining that the ride hail request is for the future time outside of the current scheduling window, determining, by the one or more processors, to provisionally accept the ride hail request based on an expected autonomous vehicle fleet capacity for a timeframe encompassing the future time;

upon provisionally accepting the ride hail request, storing, by the one or more processors, the ride hail request in a future trip record;

determining, by the one or more processors, when an updated version of the current scheduling window encompasses the future time;

upon determining that updated version of the current scheduling window encompasses the future time, retrieving, by the one or more processors, the ride hail request stored in the future trip record;

attempting to satisfy the ride hail request with a selected vehicle configured to provide the pickup or the drop-off in an autonomous driving mode, wherein attempting to satisfy the ride hail request comprises sending, by the one or more processors, instructions to the selected vehicle to cause the selected vehicle to operate according to a proposed trip plan, the proposed trip plan being based on the pickup or the drop-off; and sending, by the one or more processors, a notification to the client device indicating whether the attempt to satisfy the ride hail request with the selected vehicle was successful.

2. The method of claim 1, wherein determining when the updated version of the current scheduling window encompasses the future time includes periodically probing a trip plan module according to the future trip record.

3. The method of claim 1, wherein determining when the updated version of the current scheduling window encompasses the future time includes querying a database containing the future trip record when there is a match between the updated version of the current scheduling window and a timeslot encompassing the future time.

4. The method of claim 1, wherein the ride hail request in the future trip record is stored separately from trip records within the current scheduling window.

5. The method of claim 1, wherein determining to provisionally accept the ride hail request includes rejecting the ride hail request and issuing a suggestion to the client device to schedule the pickup or the drop-off at a later time.

6. The method of claim 5, wherein the suggestion identifies either a particular later time or a time window in which the ride hail request should be resubmitted to the ride hailing system.

7. The method of claim 6, wherein the time window comprises a set of available timeslots.

8. The method of claim 7, wherein the set of available timeslots includes selected timeslots closest in time to the ride hail request.

9. The method of claim 1, wherein attempting to satisfy the ride hail request includes treating the ride hail request as a real-time request within the updated version of the current scheduling window.

10. The method of claim 1, wherein attempting to satisfy the ride hail request includes submitting the ride hail request to a trip plan module of the ride hailing system.

11. The method of claim 10, wherein submitting the ride hail request to the trip plan module includes resubmitting the ride hail request one or more times to the trip plan module when an initial submission is denied.

12. The method of claim 1, wherein determining to provisionally accept the ride hail request includes evaluating whether a maximum number of ride hail requests has already been received for a given timeslot corresponding to the ride hail request.

13. The method of claim 12, wherein the evaluating is done according to an expected vehicle capacity for a timeframe that encompasses the given timeslot.

14. The method of claim 1, wherein the notification indicates one or more timeslots for the pickup to be scheduled or the drop-off to be scheduled.

15. The method of claim 1, wherein the notification indicates at least one of an alternative pickup or drop-off time, or an alternative pickup or drop-off location.

16. The method of claim 1, wherein provisionally accepting the ride hail request includes the ride hailing system attempting to add additional vehicles in order to provide service during the future time.

17. The method of claim 1, wherein determining to provisionally accept the ride hail request includes allocating a first amount of vehicles to handle future trip requests and allocating a second amount of vehicles to handle real-time trip requests.

18. A ride hailing system, comprising:

memory configured to store trip requests; and one or more processors operatively coupled to the memory, the one or more processors being configured to:

receive a ride hail request from a client device of a user, the ride hail request including information about at least one of a pickup to be scheduled or a drop-off to be scheduled;

determine that the ride hail request is for a future time outside of a current scheduling window for trip planning by the ride hailing system;

upon determination that the ride hail request is for the future time outside of the current scheduling window, determine to provisionally accept the ride hail request based on an expected autonomous vehicle fleet capacity for a timeframe encompassing the future time;

upon provisional acceptance of the ride hail request, store the ride hail request in a future trip record;

determine when an updated version of the current scheduling window encompasses the future time;

upon determination that updated version of the current scheduling window encompasses the future time, retrieve the ride hail request stored in the future trip record;

attempt to satisfy the ride hail request with a selected vehicle configured to provide the pickup or the drop-off in an autonomous driving mode, wherein attempting to satisfy the ride hail request comprises send instructions to the selected vehicle to cause the selected vehicle to operate according to a proposed trip plan, the proposed trip plan being based on the pickup to be scheduled or the drop-off to be scheduled; and send a notification to the client device indicating whether the attempt to satisfy the ride hail request with the selected vehicle was successful.

19. The ride hailing system of claim 18, wherein determination of when the updated version of the current scheduling window encompasses the future time includes either:

periodically probe a trip plan module according to the future trip record; or query a database containing the future trip record when there is a match between the updated version of the current scheduling window and a timeslot encompassing the future time.

20. The ride hailing system of claim 18, wherein the ride hail request in the future trip record is stored separately in the memory from trip records within the current scheduling window.

21. The method of claim 1, wherein the expected autonomous vehicle fleet capacity is based on a number of autonomous vehicles within an autonomous vehicle fleet.

* * * * *